US012707273B2

(12) United States Patent
Kim et al.

(10) Patent No.: US 12,707,273 B2
(45) Date of Patent: Aug. 11, 2026

(54) SPATIAL REUSE FOR LOW LATENCY TRAFFIC

(71) Applicant: Ofinno, LLC, Reston, VA (US)

(72) Inventors: Jeongki Kim, Fairfax, VA (US); Leonardo Alisasis Lanante, Reston, VA (US); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 341 days.

(21) Appl. No.: 18/599,776

(22) Filed: Mar. 8, 2024

(65) Prior Publication Data

US 2024/0305995 A1 Sep. 12, 2024

Related U.S. Application Data

(60) Provisional application No. 63/450,991, filed on Mar. 9, 2023.

(51) Int. Cl.
*H04W 16/02* (2009.01)

(52) U.S. Cl.
CPC .................................. *H04W 16/02* (2013.01)

(58) Field of Classification Search
CPC ..................................................... H04W 16/02
See application file for complete search history.

(56) References Cited

U.S. PATENT DOCUMENTS

2023/0309008 A1* 9/2023 Cariou .................. H04W 48/18
2024/0324012 A1* 9/2024 Cariou ............. H04W 74/0816

FOREIGN PATENT DOCUMENTS

CN 119071244 A * 12/2024 .......... H04W 72/512
EP 4231773 A1 * 8/2023 ......... H04L 27/2602
JP 2024518101 A * 4/2024 ......... H04L 27/0006

OTHER PUBLICATIONS

Wook Bong Lee et al.; Latency Reduction Scheme for UHR; IEEE 802.11-22/1393r0; Sep. 2022.
Thomas Handte et al.; Latency and Reliability enhancements for UHR; IEEE 802.11-22/1880r1; Nov. 2022.
Kiseon Ryu et al.; Low Latency Support in UHR; IEEE 802.11-23/0018r1; Feb. 2023.

* cited by examiner

*Primary Examiner* — Erika A Washington
(74) *Attorney, Agent, or Firm* — James Bender; Kavon Nasabzadeh; Yasser Mourtada

(57) ABSTRACT

A first station (STA) receives, from a second STA, a first physical layer protocol data unit (PPDU) comprising an indication of whether low latency (LL) overlapping basic service set (OBSS) packet detect-based spatial reuse (LL OBSS PD-based SR) over the first PPDU is allowed. On receiving the first PPDU, the first STA performs, a spatial reuse (SR) procedure using a LL OBSS PD level based on, the indication indicating allowance of the LL OBSS PD-based SR over the first PPDU, and the first STA having LL traffic for transmission.

20 Claims, 18 Drawing Sheets

Version Independent subfields
Version Dependent subfields

Figure 5:
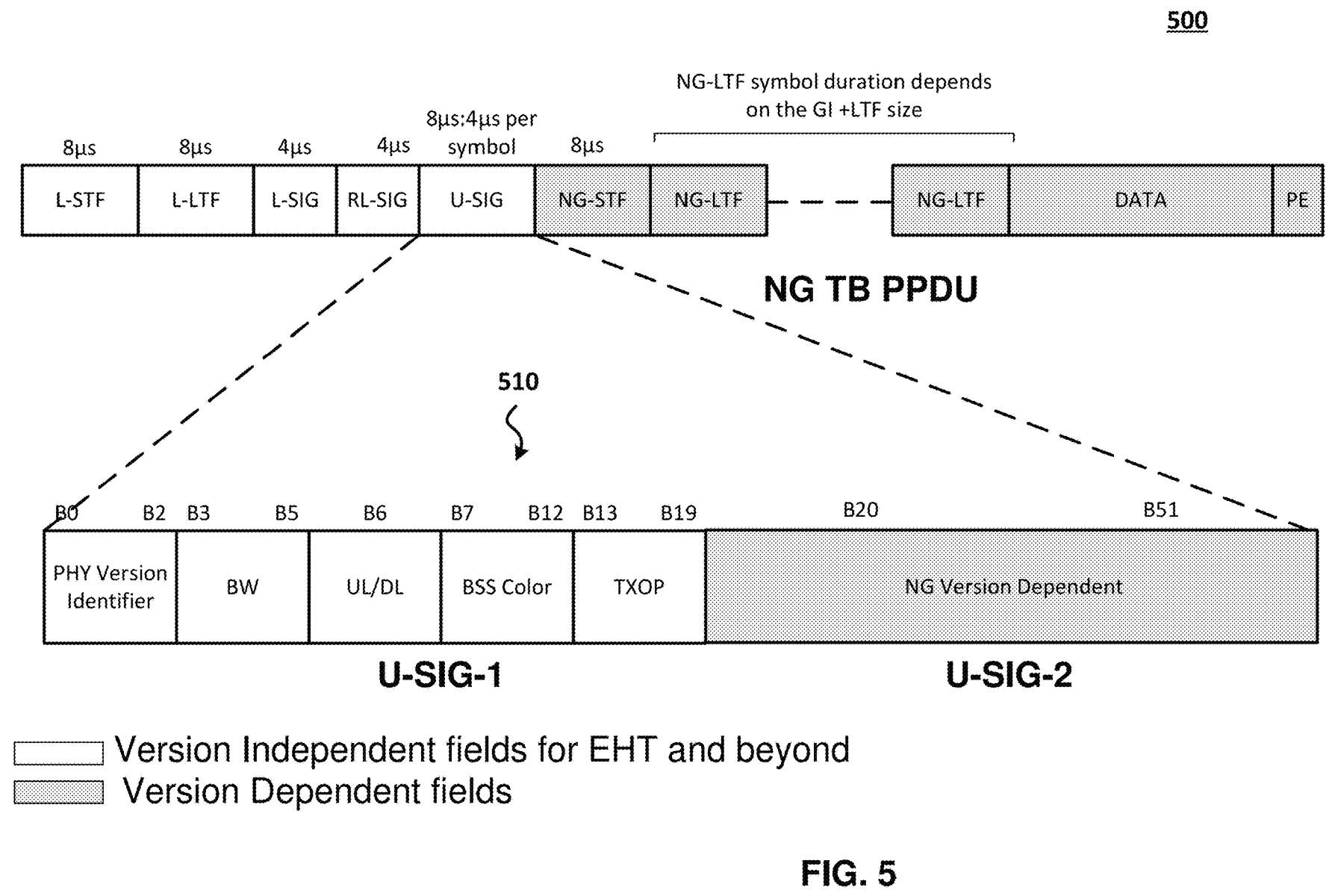

500

8µs | 8µs | 4µs | 4µs | 8µs:4µs per symbol | 8µs

L-STF | L-LTF | L-SIG | RL-SIG | U-SIG | NG-STF | NG-LTF | NG-LTF | DATA | PE

NG-LTF symbol duration depends on the GI +LTF size

NG TB PPDU

510

B0 B2 B3 B5 B6 B7 B12 B13 B19 B20 B51

PHY Version Identifier | BW | UL/DL | BSS Color | TXOP | NG Version Dependent

U-SIG-1

U-SIG-2

Version Independent fields for EHT and beyond

Version Dependent fields

| Value | Meaning |
| --- | --- |
| 0 | PSR_DISALLOW |
| 1 | PSR= -80 dBm |
| 2 | PSR= -74 dBm |
| 3 | PSR= -68 dBm |
| 4 | PSR= -62 dBm |
| 5 | PSR= -56 dBm |
| 6 | PSR= -50 dBm |
| 7 | PSR= -47 dBm |
| 8 | PSR= -44 dBm |
| 9 | PSR= -41 dBm |
| 10 | PSR= -38 dBm |
| 11 | PSR= -35 dBm |
| 12 | PSR= -32 dBm |
| 13 | PSR= -29 dBm |
| 14 | PSR= -26 dBm |
| 15 | PSR_AND_NON_SRG_OBSS_PD_PROHIBITED |

SPATIAL REUSE FOR LOW LATENCY TRAFFIC

CROSS-REFERENCE TO RELATED APPLICATIONS

This application claims the benefit of U.S. Provisional Application No. 63/450,991, filed Mar. 9, 2023, which is hereby incorporated by reference in its entirety.

BRIEF DESCRIPTION OF THE DRAWINGS

Examples of several of the various embodiments of the present disclosure are described herein with reference to the drawings.

FIG. 5 illustrates an example Next Generation (NG) PPDU.

FIG. 9 illustrates an example signaling scheme which may be used in a Parameterized Spatial Reuse Reception (PSRR) PPDU or an EHT TB PPDU.

DETAILED DESCRIPTION

Figure 1:
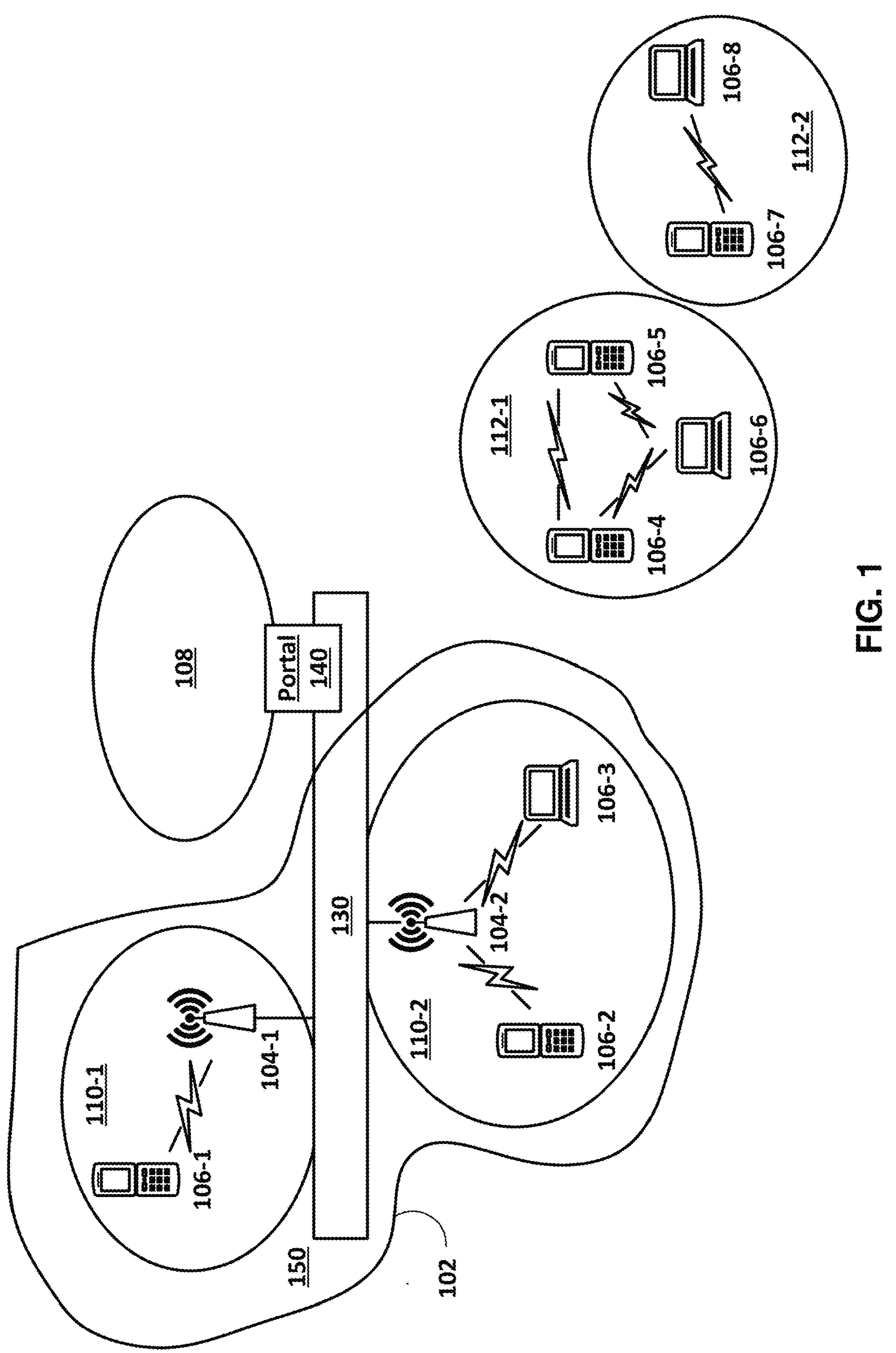
FIG. 1 illustrates example wireless communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. After reading the description, it will be apparent to one skilled in the relevant art how to implement alternative embodiments. The present embodiments may not be limited by any of the described example embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a station, an access point, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, may be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={STA1, STA2} are: {STA1}, {STA2}, and { STA1, STA2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages/frames comprise a plurality of parameters, it implies that a parameter in the plurality of parameters is in at least one of the one or more messages/frames but does not have to be in each of the one or more messages/frames.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, application-specific integrated circuits (ASICs); field programmable gate arrays (FPGAs); and complex programmable logic devices (CPLDs). Computers, microcontrollers, and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1 illustrates example wireless communication networks in which embodiments of the present disclosure may be implemented.

As shown in FIG. 1, the example wireless communication networks may include an Institute of Electrical and Electronic Engineers (IEEE) 802.11 (WLAN) infra-structure network 102. WLAN infra-structure network 102 may include one or more basic service sets (BSSs) 110 and 120 and a distribution system (DS) 130.

BSS 110-1 and 110-2 each includes a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS perform an association procedure to communicate with each other.

DS 130 may be configured to connect BSS 110-1 and BSS 110-2. As such, DS 130 may enable an extended service set (ESS) 150. Within ESS 150, APs 104-1 and 104-2 are connected via DS 130 and may have the same service set identification (SSID).

WLAN infra-structure network 102 may be coupled to one or more external networks. For example, as shown in FIG. 1, WLAN infra-structure network 102 may be connected to another network 108 (e.g., 802.X) via a portal 140. Portal 140 may function as a bridge connecting DS 130 of WLAN infra-structure network 102 with the other network 108.

The example wireless communication networks illustrated in FIG. 1 may further include one or more ad-hoc networks or independent BSSs (IBSSs). An ad-hoc network or IBSS is a network that includes a plurality of STAs that are within communication range of each other. The plurality of STAs are configured so that they may communicate with each other using direct peer-to-peer communication (i.e., not via an AP).

For example, in FIG. 1, STAs 106-4, 106-5, and 106-6 may be configured to form a first IBSS 112-1. Similarly, STAs 106-7 and 106-8 may be configured to form a second IBSS 112-2. Since an IBSS does not include an AP, it does not include a centralized management entity. Rather, STAs within an IBSS are managed in a distributed manner. STAs forming an IBSS may be fixed or mobile.

A STA as a predetermined functional medium may include a medium access control (MAC) layer that complies with an IEEE 802.11 standard. A physical layer interface for a radio medium may be used among the APs and the non-AP stations (STAs). The STA may also be referred to using various other terms, including mobile terminal, wireless device, wireless transmit/receive unit (WTRU), user equipment (UE), mobile station (MS), mobile subscriber unit, or user. For example, the term "user" may be used to denote a STA participating in uplink Multi-user Multiple Input, Multiple Output (MU MIMO) and/or uplink Orthogonal Frequency Division Multiple Access (OFDMA) transmission.

A physical layer (PHY) protocol data unit (PPDU) may be a composite structure that includes a PHY preamble and a payload in the form of a PLCP service data unit (PSDU). For example, the PSDU may include a PHY Convergence Protocol (PLCP) preamble and header and/or one or more MAC protocol data units (MPDUs). The information provided in the PHY preamble may be used by a receiving device to decode the subsequent data in the PSDU. In instances in which PPDUs are transmitted over a bonded channel (channel formed through channel bonding), the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHZ, 5 GHZ, and/or 6 GHz bands, each of which may be divided into multiple 20 MHz channels. The PPDUs may be transmitted over a physical channel having a minimum bandwidth of 20 MHz. Larger channels may be formed through channel bonding. For example, PPDUs may be transmitted over physical channels having bandwidths of 40 MHz, 80 MHZ, 160 MHz, or 520 MHz by bonding together multiple 20 MHz channels.

Figure 2:
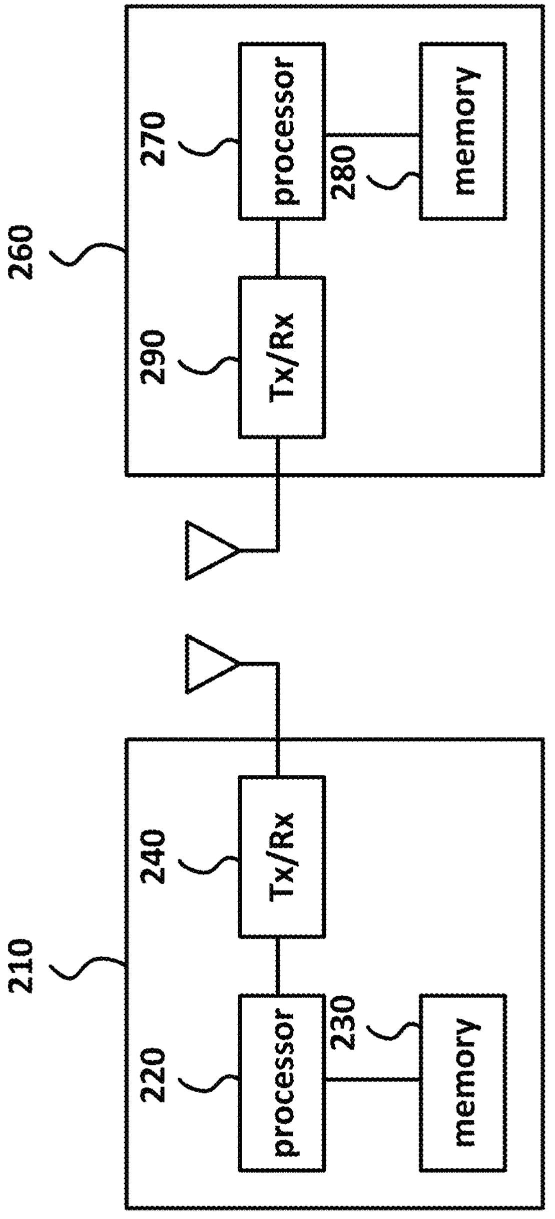
FIG. 2 is a block diagram illustrating example implementations of a station (STA) and an access point (AP).

FIG. 2 is a block diagram illustrating example implementations of a STA 210 and an AP 260.

As shown in FIG. 2, STA 210 may include at least one processor 220, a memory 230, and at least one transceiver 240. AP 260 may include at least one processor 270, memory 280, and at least one transceiver 290. Processor 220/270 may be operatively connected to transceiver 240/290.

Transceiver 240/290 may be configured to transmit/receive radio signals. In an embodiment, transceiver 240/290 may implement a PHY layer of the corresponding device (STA 210 or AP 260).

In an embodiment, STA 210 and/or AP 260 may be a multi-link device (MLD), that is a device capable of operating over multiple links as defined by the IEEE 802.11be standard amendment. As such, STA 210 and/or AP 260 may each have multiple PHY layers. The multiple PHY layers may be implemented using one or more of transceivers 240/290.

Processor 220/270 may implement functions of the PHY layer, the MAC layer, and/or the logical link control (LLC) layer of the corresponding device (STA 210 or AP 260).

Processor 220/270 and/or transceiver 240/290 may include application specific integrated circuit (ASIC), other chipset, logic circuit and/or data processor. Memory 230/280 may include read-only memory (ROM), random access memory (RAM), flash memory, memory card, storage medium and/or other storage unit.

When the embodiments are executed by software, the techniques (or methods) described herein can be executed with modules (e.g., processes, functions, and so on) that perform the functions described herein. The modules can be stored in memory 230/280 and executed by processor 220/270. Memory 230/280 may be implemented (or positioned) within processor 220/270 or external to processor 220/270. Memory 230/280 may be operatively connected to processor 220/270 via various means known in the art.

Figure 3:
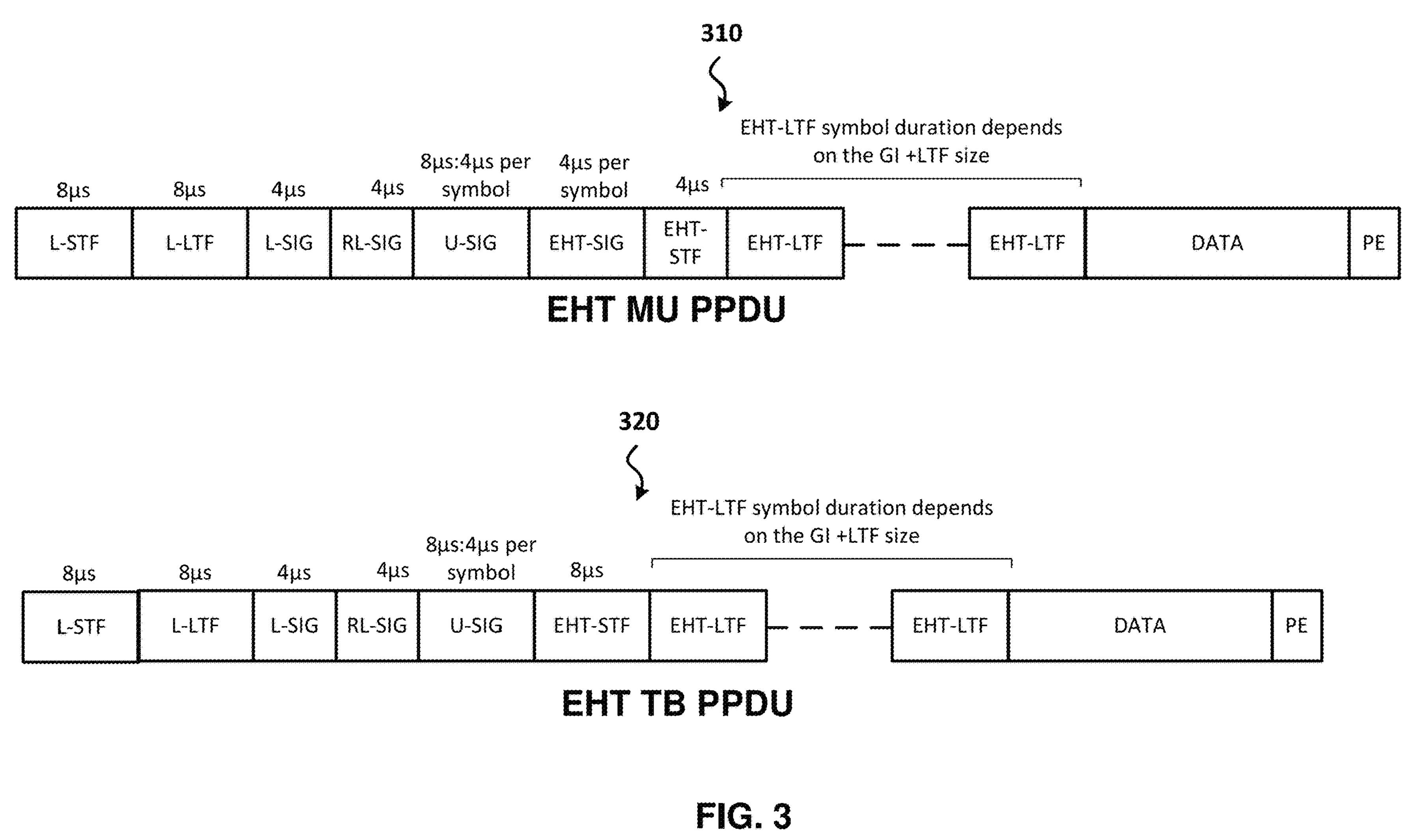
FIG. 3 illustrates examples of Physical Layer Protocol Data Units (PPDUs) which may be used by Extremely High Throughput (EHT) devices.

FIG. 3 illustrates examples of PPDUs which may be used by Extremely High Throughput (EHT) devices. EHT devices may be APs or STAs conforming to the IEEE 802.11be standard amendment. Two EHT PPDU formats are illustrated in FIG. 3: an EHT Multi-user (MU) PPDU format, as illustrated by EHT MU PPDU 310, and an EHT Trigger Based (TB) PPDU format, as illustrated by EHT TB PPDU 320.

EHT MU PPDU 310 may be used for transmission to one or more users. As shown in FIG. 3, EHT MU PPDU 310 includes a Legacy Short Training field (L-STF), a Legacy Long Training field (L-LTF), a Legacy Signal field (L-SIG), a Repeated Legacy Signal field (RL-SIG), a Universal Signal field (U-SIG), an EHT Signal field (EHT-SIG), an EHT Short Training field (EHT-STF) field, an EHT Long Training field (EHT-LTF) field, a Data field, and a Packet extension field. The RL-SIG, U-SIG, EHT-STF, EHT-LTF, and PE fields are typically present in all EHT PPDU formats. The EHT-SIG field is typically present only in the EHT MU PPDU. The L-STF, L-LTF, L-SIG, RL-SIG, U-SIG, and EHT-SIG fields are referred to as pre-EHT modulated fields, while the EHT-STF, EHT-LTF, Data, and PE fields are referred to as the EHT modulated fields.

EHT TB PPDU 320 may be used for a transmission in response to a triggering frame from an AP. The triggering frame can be a Trigger Frame (TF) control frame or any frame carrying a Triggered Response Scheduling Control subfield.

As shown in FIG. 3, EHT TB PPDU 320 includes a Legacy Short Training field (L-STF), a Legacy Long Training field (L-LTF), a Legacy Signal field (L-SIG), a Repeated Legacy Signal field (RL-SIG), a Universal Signal field U-SIG, an EHT Short Training field (EHT-STF) field, an EHT Long Training field (EHT-LTF) field, a Data field, and a Packet extension field. It is noted that in the EHT TB PPDU format, the EHT-SIG field is not present and the duration of the EHT-STF field is twice the duration of the EHT-STF field in the EHT MU PPDU format.

For the EHT MU PPDU, all the fields starting from the L-STF up to the EHT-SIG make up the EHT preamble. For the EHT TB PPDU, the fields starting from the L-STF up to the U-SIG make up the EHT preamble. To process a PPDU correctly and decode its payload, a STA may perform preamble format detection by detecting what field it receives in real time as it receives the entire PPDU. For example, checking for repetition from time interval 16 μs to 20 μs and time interval 20 μs to 24 μs after the start of the PPDU may indicate that the PPDU is likely an EHT MU PPDU or an EHT TB PPDU instead of a non-High Throughput (HT) PPDU as the non-HTPPDU format only have an L-SIG but not an RL-SIG.

Figure 4:
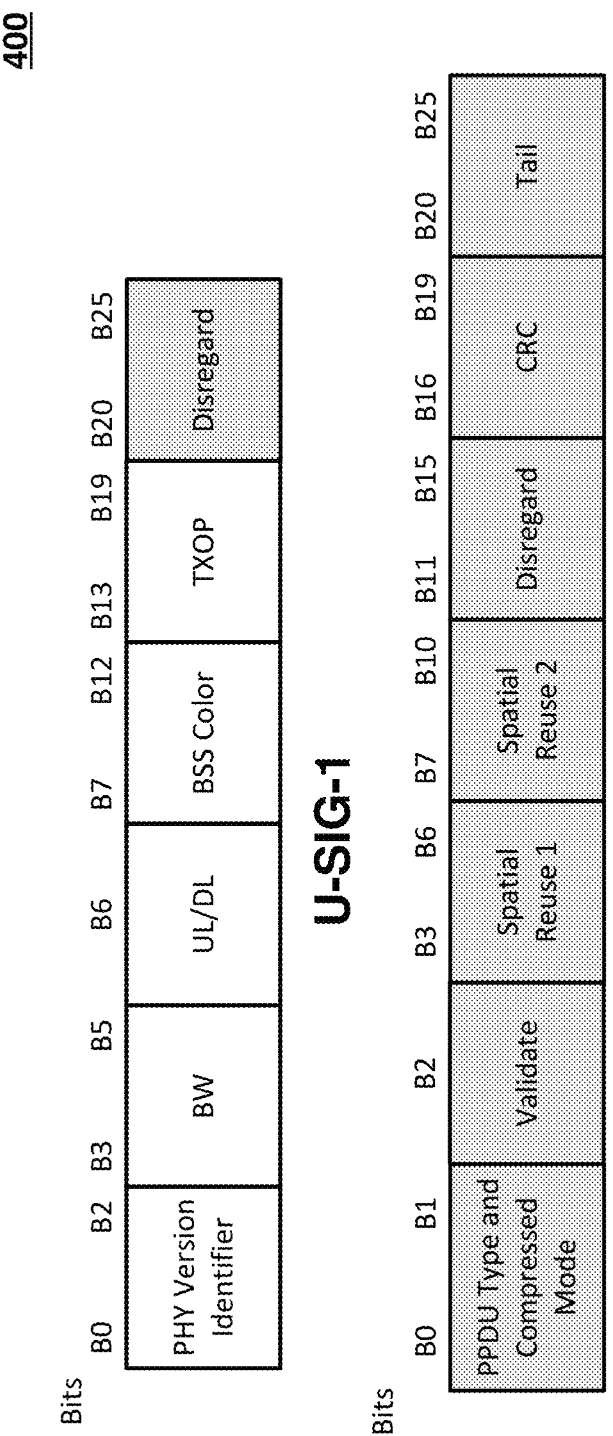
FIG. 4 illustrates an example U-SIG field which may be used in EHT Trigger Based (TB) PPDUs.

FIG. 4 illustrates an example U-SIG field 400 which may be used in EHT TB PPDUs. As shown in FIG. 4, U-SIG field 400 includes two symbols, U-SIG-1 and U-SIG-2, each containing 26 bits.

U-SIG field 400 is designed to bring forward compatibility to the EHT preamble via the introduction of version independent subfields. For the EHT PHY, version independent subfields are located in U-SIG-1 only. Version independent subfields are subfields that are consistent in location and interpretation across various IEEE 802.11 PHY layers. The intent of version independent subfields is to achieve better coexistence among IEEE 802.11 PHYs that are defined for 2.4, 5, and 6 GHz spectrum from the EHT PHY specification onwards.

As shown in FIG. 4, U-SIG field 400 includes version independent subfields followed by version dependent subfields. The version independent subfields are located from bit B0 to B19 of U-SIG-1, while the version dependent subfields are located from bits B20 to B25 of U-SIG-1 and over all the bits of U-SIG-2.

The PHY Version Identifier subfield is one of the version independent subfields in U-SIG field 400. The purpose of the PHY Version Identifier is to facilitate autodetection for IEEE 802.11 PHY layers that are defined for 2.4, 5, and 6 GHz spectrum from the EHT PHY specification onwards. The value of this subfield is used to identify the exact PHY version of the EHT PPDU.

Other version independent subfields include a Bandwidth (BW) subfield, which indicates the PPDU bandwidth, an Uplink/Downlink (UL/DL) subfield, which indicates whether the PPDU is an uplink or a downlink PPDU, a BSS Color subfield, which indicates the BSS Color of the PPDU, and a TXOP subfield, which indicates a duration of a transmit opportunity (TXOP) in which the PPDU is transmitted.

Version dependent subfields in U-SIG field 400 are subfields specific to an IEEE 802.11 PHY. For example, in FIG. 4, the version dependent subfields include a Disregard subfield in U-SIG-1 and all the subfields in U-SIG-2. As shown in FIG. 4, U-SIG-2 may include a PPDU Type and Compressed Mode subfield, a Validate subfield, a Spatial Reuse 1 subfield, a Spatial Reuse 2 subfield, a Disregard subfield, a CRC subfield, and a Tail subfield.

Disregard subfields (e.g. bits B20 to B25 of U-SIG-1 and bits B11 to B15 of U-SIG-2) are intended for use by a future PHY Version that may not be supported by a receiving STA. A Receiving STA may ignore these subfields without impact on the STA's continued reception of the PPDU (i.e., reception at the STA can continue as usual after skipping these fields).

The PPDU Type and Compressed Mode subfield indicates the type of PPDU among a number of PPDU types (e.g., EHT MU PPDU or EHT TB PPDU) supported by a particular PHY Version.

Validate subfields such as bit B2 in U-SIG-2 may indicate whether to continue or terminate the reception of a PPDU at a STA. If a STA encounters a PPDU where at least one field in the preamble that is identified as Validate for the STA is not set to the value specified for the field in that PHY version, the STA may terminate the reception of the PPDU. In this case, it waits until the PPDU's estimated duration expires and report the information from the version independent subfields to the MAC layer. Similarly, the STA may terminate the reception of the PPDU when at least one field in the preamble equals a value that is identified as Validate for the STA.

Spatial Reuse subfields 1 and 2 may contain parameters to support spatial reuse features defined in a specific PHY version. Since these are version dependent subfields, only STAs supporting a specific PHY version are able to understand these bits.

The CRC subfield contains a frame check sum to validate the correctness of U-SIG field contents. The Tail subfield is set to 0 and is used to terminate the trellis of a convolutional encoder used to encode U-SIG fields.

FIG. 5 illustrates an example PPDU 500 that may be defined in a post-EHT PHY (hereinafter, this future PHY version is referred to as Next Generation (NG) PHY). Specifically, example PPDU 500 may be a TB PPDU variant that may be supported by NG PHY (hereinafter called NG TB PPDU). PPDU 500 may be a response to a triggering frame that may be defined in an NG amendment of the IEEE 802.11 standard.

A shown in FIG. 5, PPDU 500 includes an L-STF, an L-LTF, an L-SIG, an RL-SIG, a U-SIG 510, a NG Short Training Field (NG-STF), a NG Long Training Field (NG-LTF), a DATA field, and a PE field. The fields from the L-STF up to the U-SIG being version independent fields are backward compatible to the EHT PHY. The fields NG-STF up to the PE field may or may not be backward compatible to the EHT PHY. In order to differentiate PPDU 500 as an NG TB PPDU, the PHY Version Identifier field may be set to a different value than that of the PHY Version Identifier of EHT (which is zero).

U-SIG 510 of PPDU 500 while backward compatible to the EHT PHY, may have different contents than U-SIG field 400 in the Version Dependent portion of the field. For example, in PPDU 500, bits B20 to B51 of U-SIG 510 may be used to support NG TB PPDU features, some of which may be identical or similar to features supported by EHT PHY. In some embodiments, the NG TB PPDU features may include: 1. Support for Multiple AP group transmission, and 2. Support for a Spatial Reuse feature for NG TB PPDU transmissions.

Spatial reuse (SR) operation allows the medium to be reused more often between overlapping BSSs (OBSSs) in dense deployment scenarios by the early identification of signals from OBSSs and interference management.

For SR operation, a STA receiving a PPDU may classify the PPDU as an inter-BSS or an intra-BSS PPDU. An inter-BSS PPDU is a PPDU sent from an OBSS STA. An intra-BSS PPDU is a PPDU sent from the BSS to which the STA receiving the PPDU belongs. The STA receiving the PPDU may use information in the PHY header (e.g. U-SIG, EHT-SIG) and/or MAC header (e.g. Transmit/Receive Address fields, BSS ID fields) to determine whether the PPDU is an inter-BSS or an intra-BSS PPDU. It may be possible in some cases that a PPDU cannot be determined as an inter-BSS or an intra-BSS frame. In such cases, the STA receiving the PPDU may not be able to perform a Spatial Reuse operation.

A STA that identifies a received PPDU as an inter-BSS PPDU may choose not to decode the PPDU and instead perform a channel access using HE or EHT spatial reuse operations. Two independent spatial reuse modes are defined for both HE and EHT STAs: OBSS Packet Detect (PD)-based Spatial Reuse (OBSS PD-based SR) and Parameterized Spatial Reuse (PSR)-based Spatial Reuse (PSR-based SR).

OBSS PD-based SR is a spatial reuse mode in which STAs, under specific conditions, may ignore an inter-BSS PPDU when a sensitivity level (called the OBSS PD level) is lower than a preamble detect clear channel assessment (CCA) sensitivity level. The preamble detect CCA sensitivity level is −82 dBm for 20 MHz signals and increases proportional to bandwidth of the signal (e.g. −79 dBm for 40 MHz and −76 dBm for 80 MHZ). Note that unlike the CCA sensitivity level, the OBSS PD level may be controlled dynamically by a STA to optimize its own Spatial Reuse operation.

When using OBSS PD-based SR, a STA maintains an OBSS PD level parameter (OBSS_PDlevel) and may adjust this OBSS PD level in conjunction with its transmit power and a value, PPDU_BW, derived from the received PPDU. The adjustment may be made according to $OBSS\_PDlevel \leq \max(OBSS\_PDmin, \min(OBSS\_PDmax, OBSS\_PDmin+(TX\_PWRref-TX\_PWR)))+10\log 10(PPDU\_BW/20\ MHZ)$ where OBSS_PDmin, OBSS_PDmax, TX_PWRref are parameters that are constant or in some conditions, advertised by the AP using information elements in management frames. The TX_PWRref is a reference Transmit Power used in OBSS PD-based SR mechanism and may have a value of either 21 dBm or 25 dBm depending on whether a STA or an AP is transmitting. The OBSS_PDmin and OBSS_PDmax on the other hand are parameters decided by the AP and may be advertised in management frames that it transmits. The AP uses this pair of parameters to control the level of aggressiveness of STAs within its BSS when using OBSS PD-based SR access.

Figure 6:
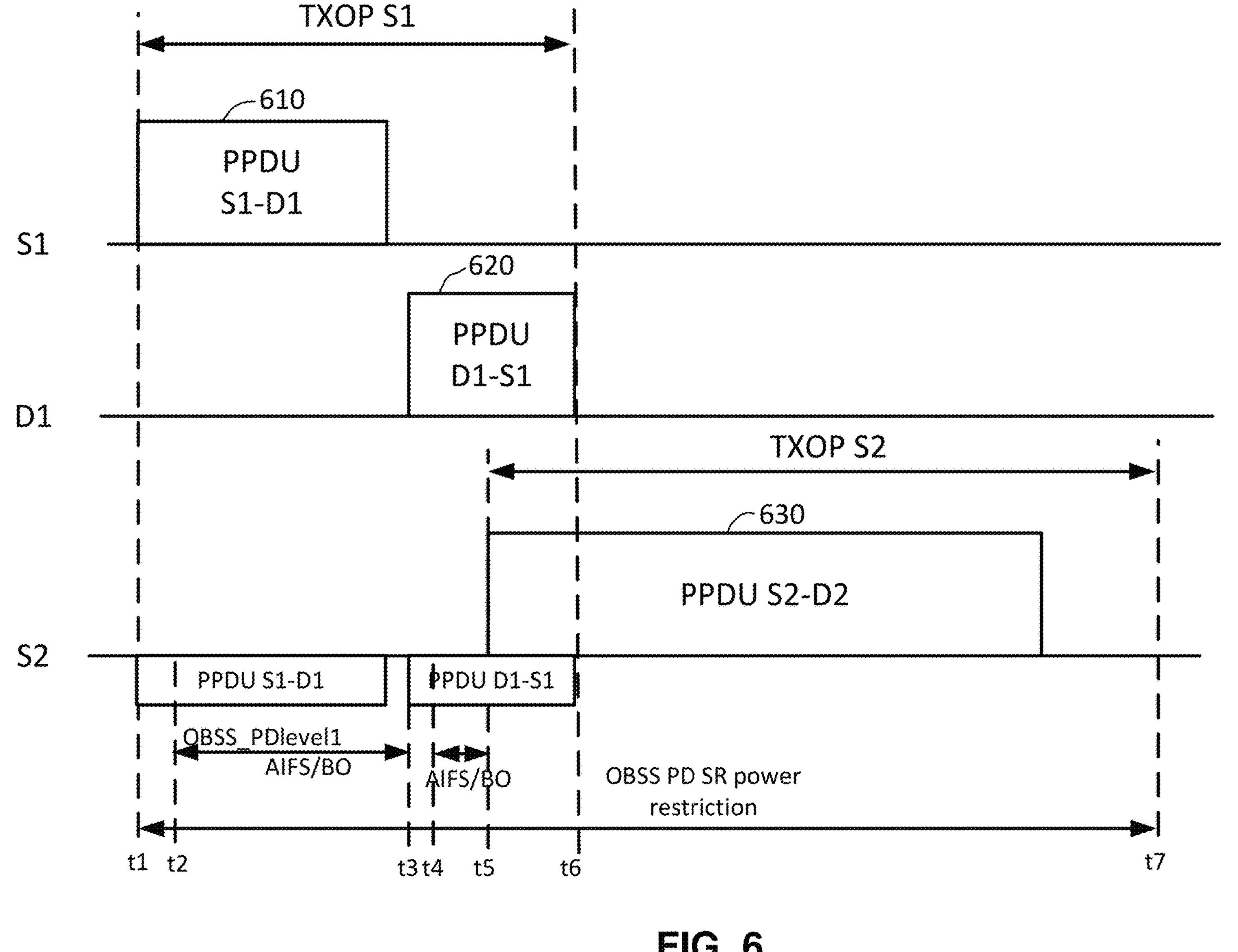
FIG. 6 illustrates an example of Overlapped Basic Service Set (OBSS) Packet Detect (PD)-based Spatial Reuse (SR) operation.

FIG. 6 illustrates an example 600 of OBSS PD-based SR operation. In example 600, a STA S1 transmits a PPDU 610 to a STA D1 at a time t1 and receives a response PPDU 620 at a time t3 from STA D1. Without SR features, a STA S2 which hears the OBSS transmissions from S1 to D1 must wait until the end of the TXOP (of S1) before being able to access the channel. That is, STA S2 must wait until time t6 in example 600.

In example 600, STA S2 may be allowed to access the channel during the TXOP of S1 using the OBSS PD-based SR mechanism. From the BSS Color of PPDU 610, S2 determines that the transmission is an inter-BSS PPDU at time t2. Starting from time t2, S2 ignores PPDU 610 using OBSS PD-based SR with OBSS_PDlevel=OBSS_PDlevel1 and defers for an Arbitration Interframe Space (AIFS) and backoff (BO) duration until the reception of PPDU 620 from D1. In this case, S2 may use a value of OBSS_PDlevel1 from a manufacturer specific algorithm. Note that the OBSS_PDlevel value is internal to S2 to serve its own Spatial Reuse goals and does not need to inform any other STA of the OBSS_PDlevel value it uses. S2 also starts an OBSS PD SR transmit power restriction period with TX_PWRmax=TX_PWRref−(OBSS_PDlevel-OBSS_PD-min), which ends after transmitting a power restricted frame.

As shown in FIG. 6, STA S2 ignores PPDU 620 using the same OBSS_PDlevel value starting from time t4 and may decrement its backoff counter until it becomes zero at time t5. At this time (15), an SR TXOP for STA S2 is granted allowing it to transmit a PPDU 630 to STA D2 with a restricted power TX_PWRmax. The transmit power restriction ends after the SR TXOP duration at time t7.

Figure 7:
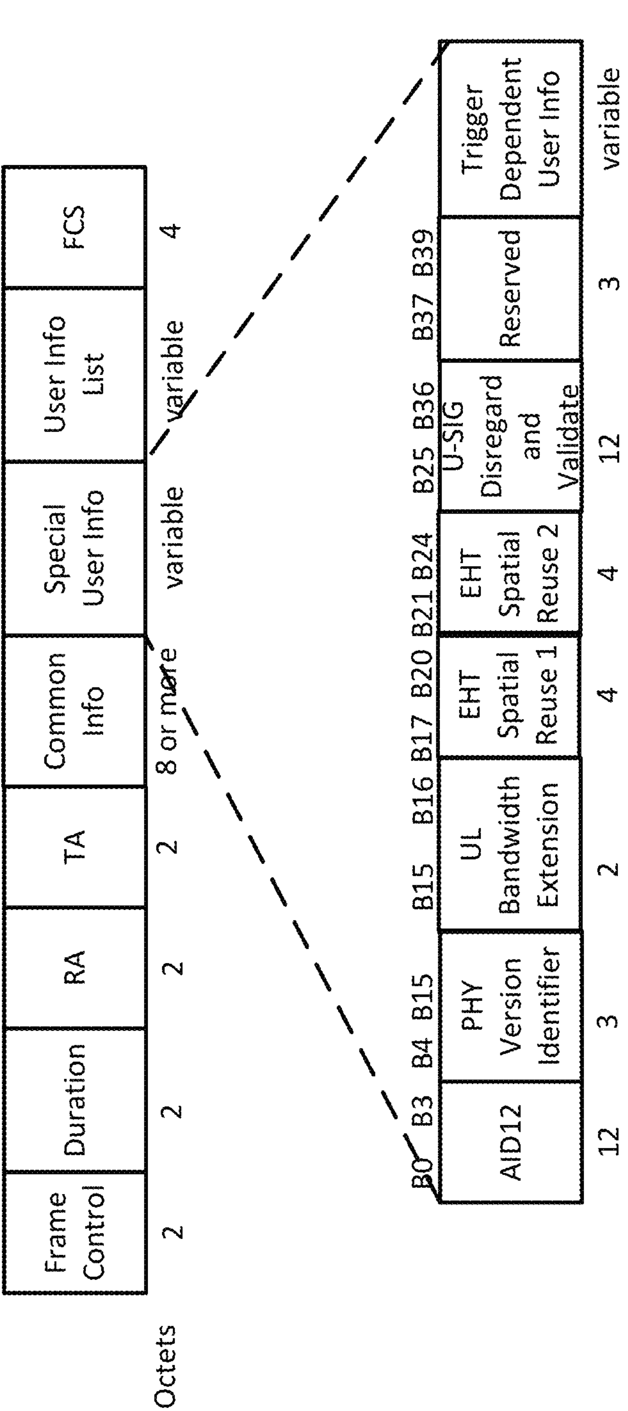
FIG. 7 illustrates an example Trigger Frame (TF) format which may be used to solicit an EHT TB PPDU from an EHT STA.

FIG. 7 illustrates an example TF 700 which may be used to solicit an EHT TB PPDU from an EHT STA. A TF carries various information required by a responding STA to send a TB PPDU. As shown in FIG. 7, TF 700 may include a Frame Control field, a Duration field, a receiving address (RA) field, a transmitting address (TA) field, a Common Info field, a Special User Info field, a User Info List field, a Padding field, and an FCS field. The fields from the Frame Control field up to the TA field form a MAC header. The fields from the Common Info field up to the User Info List field form a MAC body.

The Frame Control field includes information of the type and subtype of TF 700 which may be used by a receiving STA to classify TF 700 as a TF.

The Duration field contains a duration value (in microseconds) which is used by a receiving STA to update a network allocation vector (NAV). The NAV is a counter that it indicates to a STA an amount of time during which it must defer from accessing the shared medium.

The RA field may contain an individual MAC address value to specify a single receiving STA of TF 700 or a broadcast address in case TF 700 is intended for multiple receiving STAs. The TA field may contain the address of the AP STA transmitting TF 700.

The Common Info field is a variable size field containing information regarding the solicited TB PPDU. The information contained in Common Info field is common to all STAs targeted by TF 700. The information may include a Trigger Type, a length, and a bandwidth of the solicited TB PPDU.

Similar to the Common Info field, the Special User Info field may also contain information that is common to all STAs targeted by TF 700. As shown in FIG. 7, this information may include an AID12 subfield, a PHY Version Identifier subfield, a UL Bandwidth subfield, an EHT Spatial Reuse 1 subfield, an EHT Spatial Reuse 2 subfield, a U-SIG Disregard and Validate subfield, a Reserved subfield, and a Trigger Dependent User Info subfield.

The AID12 subfield in the Special User Info field may be set to a fixed value of 2007 to differentiate the Special User Info field from a STA specific User Info field in the User Info List field.

The PHY Version Identifier subfield indicates the PHY version of the solicited TB PPDU. The PHY Version Identifier subfield may be set to 0 for EHT PHY and to a non-zero value for future post-EHT PHY versions (e.g., NG PHY).

The UL Bandwidth Extension subfield may include additional BW bits to support EHT TB PPDU bandwidths up to 320 MHz.

The EHT Spatial Reuse 1 and 2 subfields carry values to be included in corresponding Spatial Reuse subfields in the U-SIG field of the solicited EHT TB PPDU.

The U-SIG Disregard And Validate subfield carries a value to be included in corresponding Disregard and Validate subfields of the U-SIG field of the solicited EHT TB PPDU.

The Reserved subfield is currently unused but may serve a purpose in future versions of the standard.

The Trigger Dependent User Info subfield may be used to carry additional signaling information depending on the type of TF. Its size is variable and may not exist in some TF types.

PSR-based SR is another spatial reuse mode supported in HE and EHT devices. This opportunistic spatial reuse mode allows a STA to transmit within a duration of a TB PPDU sent from an OBSS network. Opportunities for PSR-based SR are identified by the reception of an inter-BSS PPDU that contains a TF. Due to the controlled nature of the TB PPDU response in terms of transmit power and duration, constraints regarding spatial reuse interference may be set with ease.

An AP that allows PSR-based SR may specify its own acceptable interference levels dynamically for each TB PPDU it solicits. For a STA, a PSR-based SR opportunity is identified if the following two conditions are met: Condition 1) The STA receives a Parameterized Spatial Reuse Reception (PSRR) PPDU (a PPDU that is identified as an inter-BSS PPDU and that contains a TF); and Condition 2) The STA has a PPDU queued to be transmitted and the intended transmit power of the PPDU (this PPDU hereinafter is called PSR Transmission PPDU (PSRT PPDU)) in dBm, minus log 10(PPDU_BW/20 MHZ) dB, is below a power threshold value PSRT_TXP, where PPDU_BW is a bandwidth value of the PSRR PPDU in MHZ.

In some embodiments, the power threshold value PSRT_TXP is obtained by subtracting a parameter PSR indicated in 1) a UL Spatial Reuse field of the TF contained in the PSRR PPDU (e.g., indicated in EHT Spatial Reuse 1 or 2 subfields shown FIG. 7) or 2) a value in the preamble of a TB PPDU that follows the PSRR PPDU, from a parameter RPL.

The parameter RPL may be equal to the combined transmit power at the receive antenna connector, over the PSRR PPDU bandwidth, during the non-HE or non-EHT portion of the PSRR PPDU preamble, averaged over all antennas used to receive the PSRR PPDU. In some embodiments, a STA may not be able to obtain an accurate value RPL from the PSRR PPDU and may instead use a value of RPL based on previous received PPDUs (e.g. beacon frames) coming from the AP that transmitted the PSRR PPDU.

A STA that identifies a PSR-based SR opportunity may issue a reset to its PHY circuitry to ignore (e.g., terminate reception) any TB PPDU(s) that are triggered by the TF contained in the PSRR PPDU, provided that the value of the BSS Color of the TB PPDU matches the BSS Color of the PSRR PPDU. A STA that identifies a PSR-based SR opportunity may not be allowed to transmit a PSRT PPDU that terminates beyond the duration of the TB PPDU that is triggered by the TF contained in the PSRR PPDU.

Figure 8:
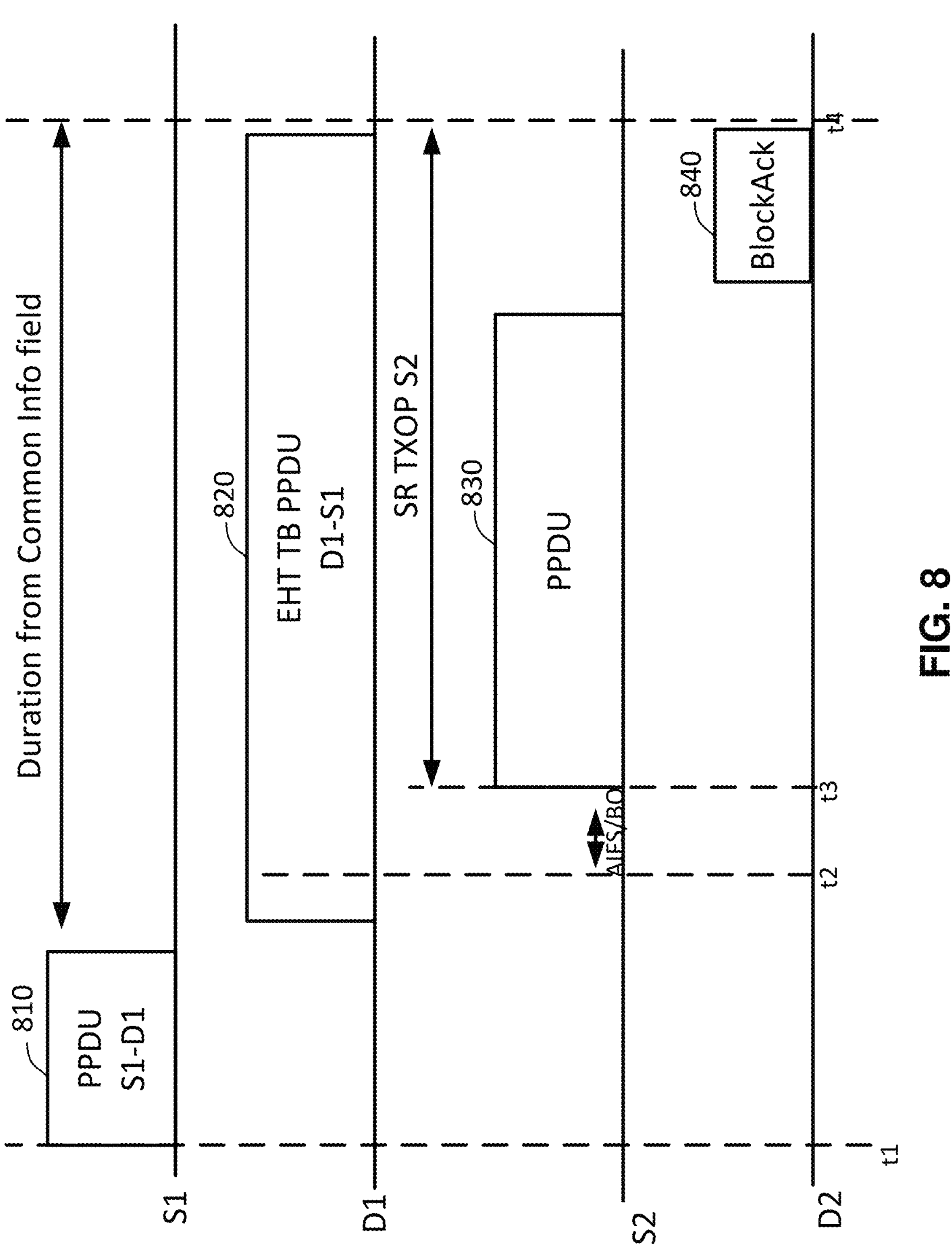
FIG. 8 illustrates an example of Parameterized Spatial Reuse (PSR)-based SR operation.

FIG. 8 illustrates an example 800 of PSR-based SR operation. Example 800 includes an AP S1, a STA D1, an AP S1, and a STA D2. S1 and D1 may belong to a different BSS (OBSS) than S2 and D2.

In example 800, AP S1 transmits a PPDU 810 containing a TF to STA D1 at time t1. In response, STA D1 may transmit an EHT TB PPDU 820 at time t2. STA D1 may decode the EHT Spatial Reuse (e.g., EHT Spatial Reuse 1 and EHT Spatial Reuse 2) subfields of a TF contained in PPDU 810 and may copy the values of the EHT Spatial Reuse subfields in a U-SIG field of EHT TB PPDU 820.

STA S2 may hear the transmission of EHT TB PPDU 820 and may identify a PSR opportunity based on TB PPDU 820. Specifically, STA S2 may determine that both Conditions 1 and 2 discussed above are satisfied, namely that PPDU 810 is an inter-BSS PPDU (based on BSS color information in the EHT Preamble of EHT TB PPDU 820) and that it contains a TF (i.e., PPDU 810 is a PSRR PPDU for STA S2) and that the PSRT_TXP computed based on PPDU 810 is enough to transmit a PSRT PPDU by STA S2.

As mentioned above, at time t2, STA D1 transmits an EHT TB PPDU 820 to STA S1. EHT TB PPDU 820 may also be received by STA S2. STA S2 verifies from the BSS Color information in the EHT Preamble of EHT TB PPDU 820 that EHT TB PPDU 820 is an inter-BSS PPDU and proceeds to start channel access to transmit a PSRT PPDU 830. After a backoff count of STA S2 decrements to 0, STA S2 transmits PSRT PPDU 830. STA S2 sets the duration of PSRT PPDU 830 short enough such that an expected Block-ACK 840 can still be transmitted within the duration indicated in the Common Info field of the TF contained in PPDU 810.

FIG. 9 illustrates an example signaling scheme 900 which may be used in a PSRR PDU or an EHT PPDU. Specifically, example signaling scheme 900 may be used to signal the PSR value contained in the EHT Spatial Reuse subfields of a PSRR PPDU or an EHT TB PPDU. In example signaling scheme 900, a value of 0 in the EHT Spatial Reuse subfield is an indication that PSR-based SR is not allowed by the AP STA. Values from 1 up to 14 in the EHT Spatial Reuse subfield, on the other hand, indicate that PSR-based SR is allowed and each specifies a numerically increasing PSR value signifying increasing tolerance for interference by the AP STA for the EHT TB PPDU. Finally, a value of 15 indicates that both PSR-based SR and OBSS PD-based SR are not allowed.

It is anticipated that future IEEE 802.11 standards provide various mechanisms to support the quality of service (QoS) requirements of low latency (LL) (or latency sensitive) traffic. Such traffic may originate from various real time applications having stringent latency requirements (e.g., very low average latency, a worst-case latency of the order of a few to tens of milliseconds, and/or a small jitter). In operation, LL traffic may be associated with one or more traffic identifiers (TIDs) associated with one or more predetermined access categories (ACs) or traffic streams (TSs) (hereinafter TIDs associated with LL traffic are called LL TIDs). The one or more predetermined ACs may comprise the access categories for video (AC_VI) and voice (AC_VO), for example.

In the context of spatial reuse, a special LL OBSS PD-based SR operation may be defined for LL traffic. As described above, in OBSS PD-based SR, a STA or AP maintains an OBSS PD level parameter and may adjust this OBSS PD level in conjunction with its transmit power. According to the existing IEEE 802.11 standard, the STA/AP may adjust the OBSS PD level to optimize its spatial reuse operation (e.g., increase its chances of a spatial reuse transmission) on condition that its OBSS PD level not exceed an upper bound given by $OBSS\_PDlevel \leq \max(OBSS\_PDmin, \min(OBSS\_PDmax, OBSS\_PDmin+(TX\_PWRref-TX\_PWR)))+10 \log 10(PPDU\_BW/20\ MHZ)$, where OBSS_PDmin and OBSS_PDmax are derived from parameters communicated by the AP in a Spatial Reuse Parameter Set element (e.g., non-SRG OBSS PD Max Offset, SRG OBSS PD Min Offset, SRG OBSS PD Max Offset), TX_PWRref is a reference transmit power value set in the IEEE 802.11 standard and pre-configured within the STA/AP, and PPDU_BW is derived based on the received PPDU (as defined by Table 26-10 (PPDU_BW determination) of the IEEE 802.11 standard ("Draft P802.11REVme/D2.1, January 2023.")).

The LL OBSS PD-based SR operation may have a STA or AP use a more aggressive spatial reuse to transmit LL traffic as opposed to non-LL traffic. For example, the LL OBSS PD-based SR operation may include performing an OBSS PD-based SR procedure using an LL OBSS PD level determined based on LL spatial reuse parameters (e.g., LL OBSS_PD min, LL OBSS_PD max, and LL TX_PWRref). Like the normal spatial reuse parameters (e.g., OBSS_PDmin, OBSS_PDmax, TX_PWRref) (hereinafter "non-LL spatial reuse parameters"), the LL spatial reuse parameters may either be derived based on a Spatial Reuse Parameter Set element transmitted by the AP or be fixed in the IEEE 802.11 standard and pre-configured within the STA/AP.

Figure 10:
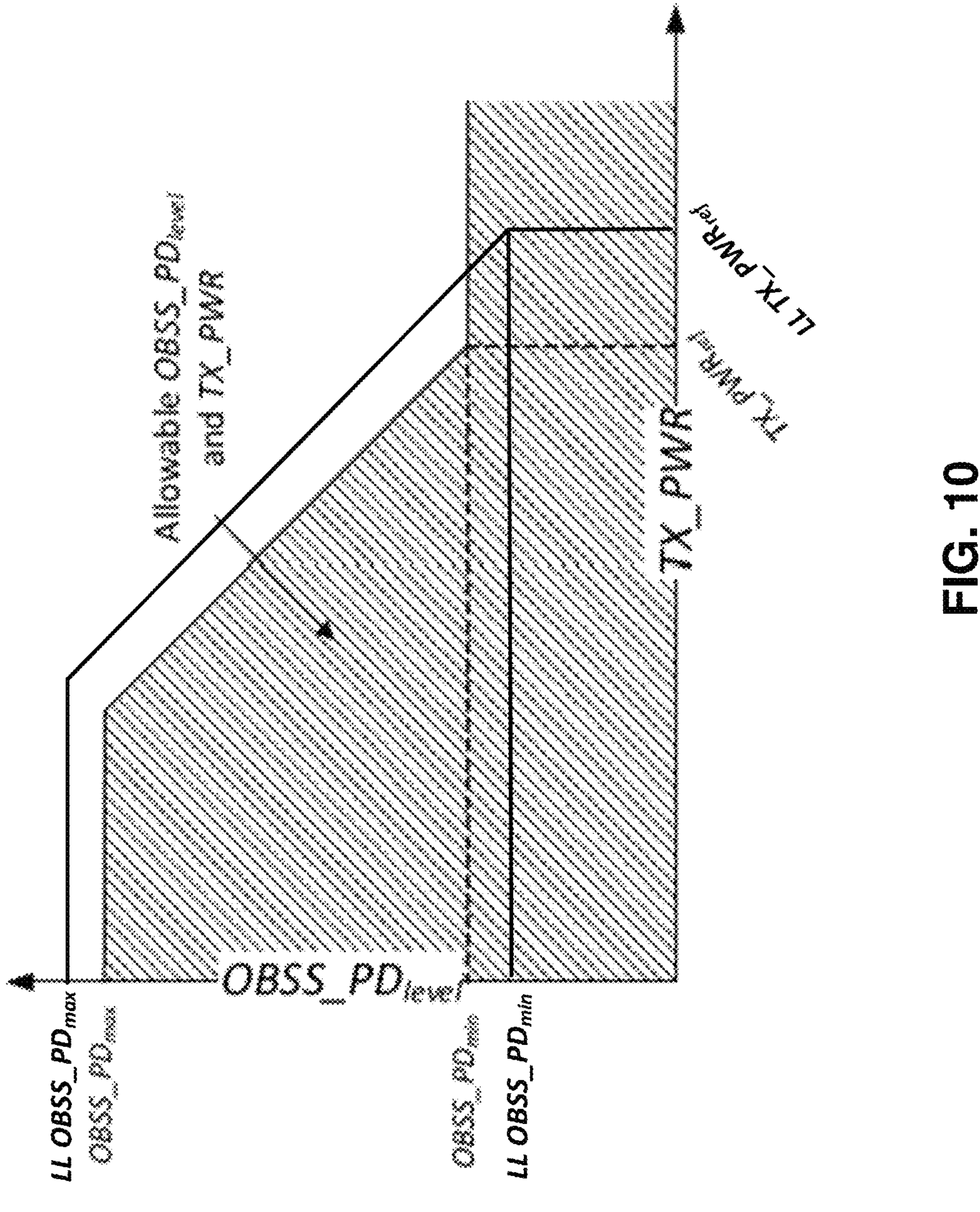
FIG. 10 illustrates allowable OBSS PD level and transmit power for low latency (LL) OBSS PD-based SR.

As illustrated in FIG. 10, in an example, the LL spatial reuse parameters may be configured to increase the range of allowable OBSS PD level and transmit power (TX_PWR) for OBSS PD-based SR. For example, as shown in FIG. 10, the LL spatial reuse parameters may include an LL OBSS_PD max that is larger than the non-LL OBSS_PD max, an LL OBSS_PD min that is lower than the non-LL OBSS_PD min, and/or an LL TX_PWRref that is larger than the non-LL TX_PWRref. By increasing the range of allowable OBSS PD level and transmit power, the STA/AP becomes more likely to transmit using OBSS PD-based SR (i.e., use a more aggressive OBSS PD-based SR).

Figure 11:
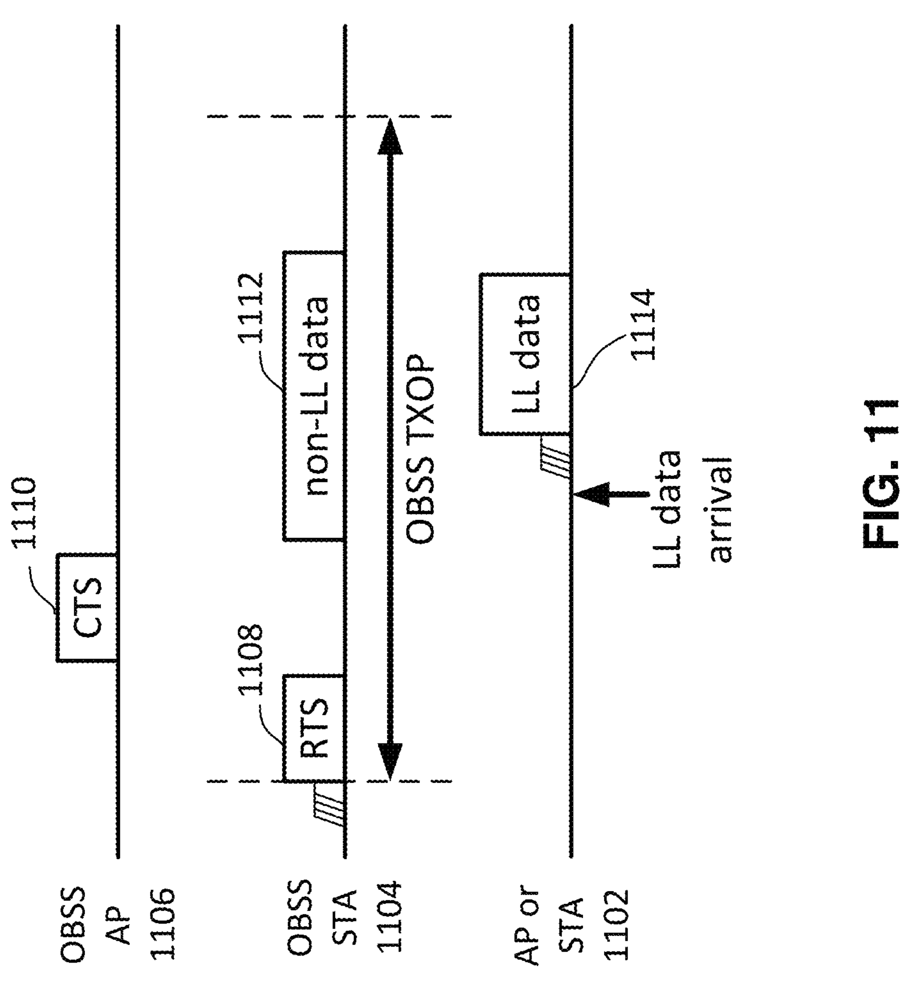
FIG. 11 is an example that illustrates an example LL OBSS PD-based SR operation.

FIG. 11 is an example 1100 that illustrates an example LL OBSS PD-based SR operation. As shown in FIG. 11, example 1100 includes an AP or STA 1102, an OBSS AP 1106, and an OBSS STA 1104. OBSS AP 1106 and OBSS STA 1104 are referred to herein as OBSS AP/STA as they belong to a different BSS than AP or STA 1102. As shown in FIG. 11, example 1100 may begin with OBSS STA 1104 obtaining a TXOP and transmitting a request to send (RTS) frame 1108 to OBSS AP 1106. OBSS AP 1106 may respond to RTS frame 1108 with a clear to send (CTS) frame 1110. On receiving CTS frame 1110, OBSS STA 1104 may begin transmitting a PPDU 1112 to OBSS AP 1106. PPDU 1112 may comprise a non-LL data frame (e.g., one or more MPDUs none of which comprising LL traffic), for example.

Before or while OBSS STA 1104 transmits PPDU 1112 to OBSS AP 1106, AP or STA 1102 may have LL traffic become available for transmission. As mentioned above, LL traffic may include traffic (e.g., medium access control service data unit (MSDU) or aggregate MSDU (A-MSDU)) associated with one or more LL TIDs. LL TIDs may be associated with one or more predetermined access categories (ACs) or traffic streams (TSs).

On receiving PPDU 1112, AP or STA 1102 may determine that PPDU 1112 is an inter-BSS PPDU. As mentioned above, an inter-BSS PPDU is a PPDU sent from an OBSS STA. On identifying PPDU 1112 as an inter-BSS PPDU, AP or STA 1102 may choose not to decode the data frame comprised in PPDU 1112 or the remaining part of PPDU 1112 and instead perform channel access using an SR operation. In example 1100, AP or STA 1102 may choose to perform a LL OBSS PD-based SR operation. The LL OBSS PD-based SR operation may include performing an OBSS PD-based SR procedure using an LL OBSS PD level determined based on LL spatial reuse parameters as described above. For example, AP or STA 1102 may adjust the OBSS PD level based on the LL spatial reuse parameters (instead of non-LL spatial reuse parameters) and use the adjusted OBSS PD level (LL OBSS PD level) in performing the OBSS PD-based SR procedure.

The OBSS PD-based SR procedure may be performed as described in section 26.10.2.2 or section 26.10.2.3 of the IEEE 802.11 standard ("Draft P802.11REVme/D2.1, January 2023.") Specifically, as part of the OBSS PD-based SR procedure, AP or STA 1102 may determine whether a number of conditions are satisfied. One condition may include checking whether a received signal strength of PPDU 1112 is lower than the LL OBSS PD level. If the conditions of the OBSS PD-based SR procedure are satisfied, AP or STA 1102 may transmit a PPDU 1114 over a part of PPDU 1112 (overlapping a part of PPDU 1112 in time and frequency). PPDU 1114 may include one or more MSDUs comprising LL data frames.

However, in example 1100, AP or STA 1102 may perform the LL OBSS PD-based SR operation based on the sole condition of PPDU 1112 being an inter-BSS PPDU, and, if the conditions of the LL OBSS PD-based SR procedure are satisfied, may transmit PPDU 1114 over PPDU 1112. AP or STA 1102 however does not consider whether OBSS STA 1104 has the capability of handling aggressive SR such as LL OBSS PD-based SR. And as AP or STA 1102 does not decode PPDU 1112 after identifying PPDU 1112 as an inter-BSS PPDU (and before performing the LL OBSS PD-based SR operation), AP or STA 1102 may not consider the type of the traffic being carried by PPDU 1112 and the potential impact of LL OBSS PD-based SR on the traffic carried by PPDU 1112. The use of the LL OBSS PD-based SR operation by AP or STA 1102 may thus cause unacceptable interference at OBSS AP 1106 and/or may result in the loss of one or more MPDUs carried by PPDU 1112. The one or more lost MPDUs may be associated with LL traffic resulting in performance degradation for the associated application. Embodiments of the present disclosure address these problems as further described below.

Figure 12:
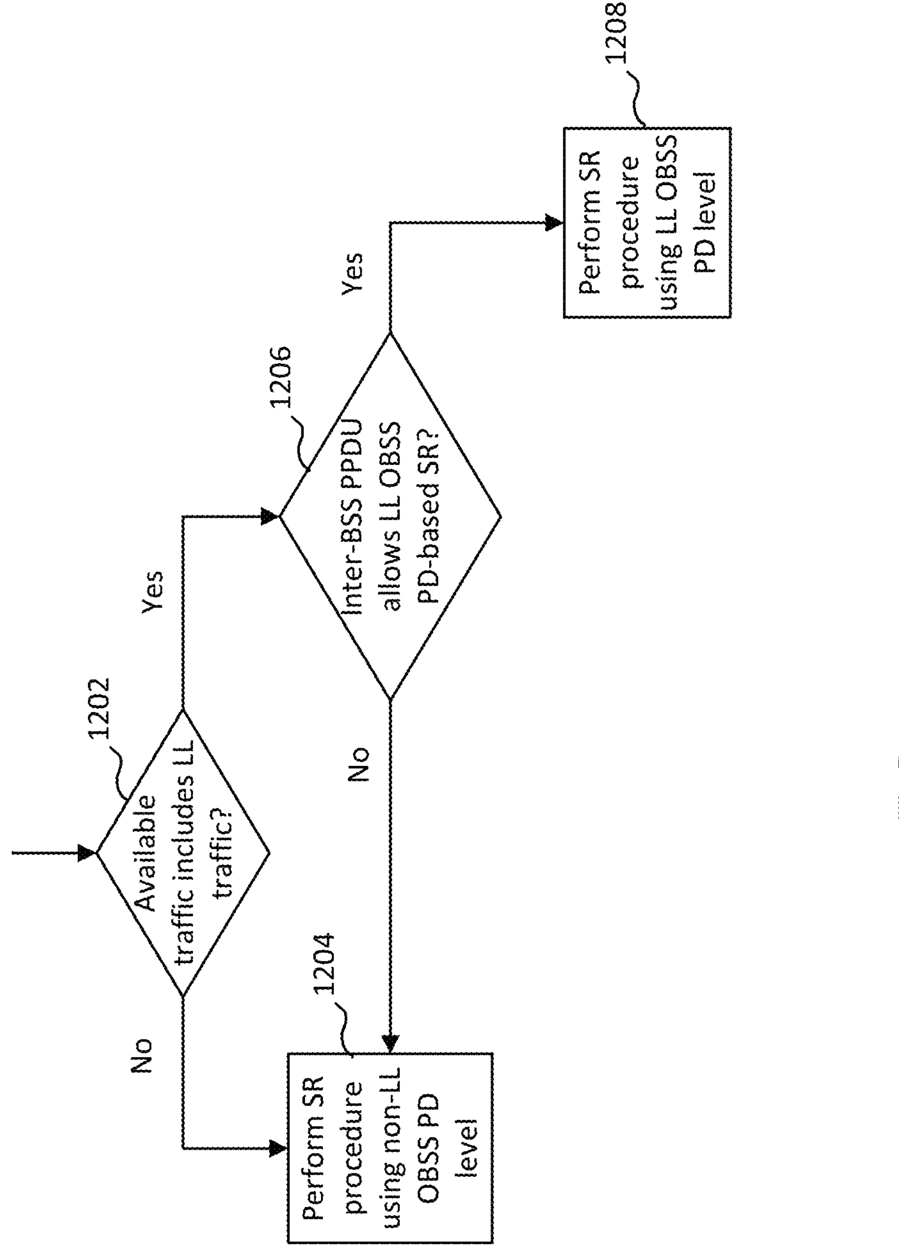
FIG. 12 illustrates an example process for performing OBSS PD-based SR according to an embodiment.

FIG. 12 illustrates an example process 1200 for performing OBSS PD-based SR according to an embodiment. Example process 1200 may be performed by an AP or a STA upon receiving an inter-BSS PPDU in the availability of traffic for transmission at the AP or STA. The inter-BSS PPDU may be transmitted by a STA or an AP of an OBSS (by an OBSS STA or an OBSS AP). In an embodiment, the inter-BSS PPDU comprises non-LL traffic. In another embodiment, the inter-BSS PPDU comprises LL traffic.

As shown in FIG. 12, process 1200 may begin in step 1202, which includes determining whether available traffic at the AP or STA includes LL traffic. As mentioned above, LL traffic may include traffic (e.g., medium access control service data unit (MSDU) or aggregate MSDU (A-MSDU)) associated with one or more LL traffic identifiers (TIDs). LL TIDs may be associated with one or more predetermined access categories (ACs) or traffic streams (TSs).

If the answer in step 1202 is no, process 1200 transitions to step 1204, which includes performing an SR procedure using a non-LL OBSS PD level (hereinafter non-LL OBSS PD-based SR procedure). The non-LL OBSS PD level may comprise a spatial reuse group (SRG) OBSS PD level or a non-SRG OBSS PD level. An SRG OBSS PD level is an OBSS PD level determined based on SRG spatial reuse parameters (e.g., SRG OBSS PD Min and SRG OBSS PD Max as defined in Table 26-12 of the IEEE 802.11 standard). A non-SRG OBSS PD level is an OBSS PD level determined based on non-SRG spatial reuse parameters (e.g., non-SRG OBSS PD Min and non-SRG OBSS PD Max as defined in Table 26-11 of the IEEE 802.11 standard). The SR procedure may be performed as described in section 26.10.2.2 or section 26.10.2.3 of the IEEE 802.11 standard ("Draft P802.11REVme/D2.1, January 2023.") In an embodiment, step 1204 may comprise comparing a received signal strength level of the inter-BSS PPDU to the non-LL OBSS PD level. If the conditions of the non-LL OBSS PD-based SR procedure are satisfied (e.g., the received signal strength level of the inter-BSS PPDU being below the non-LL OBSS PD level), the AP or STA may transmit a PPDU over a part of the inter-BSS PPDU (the PPDU overlaps a part of inter-BSS PPDU in time and frequency). The transmitted PPDU may include non-LL traffic.

If the answer in step 1202 is yes, process 1200 transitions to step 1206, which includes determining whether the inter-BSS PPDU allows LL OBSS PD-based SR. In an embodiment, the inter-BSS PPDU includes an indication of whether LL OBSS PD-based SR is allowed over the inter-BSS PPDU. In an embodiment, the indication of whether LL OBSS PD-based SR is allowed over the inter-BSS PPDU may be set to allow or disallow LL OBSS PD-based SR based on whether the OBSS STA/AP transmitting the inter-BSS PPDU is able to handle the increased interference that may be caused by LL OBSS PD-based SR. Alternatively or additionally, the indication may be set to allow LL OBSS PD-based SR when the inter-BSS PPDU does not carry LL traffic but may be set to disallow LL OBSS PD-based SR when the inter-BSS PPDU carries LL traffic. The indication of whether LL OBSS PD-based SR is allowed may be provided in a PHY header, a MAC header, or a data field of the inter-BSS PPDU. In an embodiment, the indication of whether LL OBSS PD-based SR is allowed may explicitly indicate either allowance or disallowance of LL OBSS PD-based SR. In another embodiment, the indication may explicitly indicate allowance only or disallowance only of LL OBSS PD-based SR. The absence of the indication in the inter-BSS PPDU may be interpreted by the AP or STA as disallowance or allowance, respectively, of LL OBSS PD-based SR.

If the answer in step 1206 is no, process 1200 proceeds to step 1204 described above. Namely, process 1200 includes performing a non-LL OBSS PD-based SR procedure for the LL traffic. The SR procedure may be performed as described in section 26.10.2.2 or section 26.10.2.3 of the IEEE 802.11 standard ("Draft P802.11REVme/D2.1, January 2023.") If the conditions of the non-LL OBSS PD-based SR procedure are satisfied (e.g., the received signal strength level of the inter-BSS PPDU being below the non-LL OBSS PD level), the AP or STA may transmit a PPDU over a part of the inter-BSS PPDU (the PPDU overlaps a part of inter-BSS PPDU in time and frequency).

Otherwise, if the answer in step 1206 is yes, process 1200 transitions to step 1208, which includes performing the SR procedure using a LL OBSS PD level (hereinafter LL OBSS PD-based SR procedure). In an embodiment, step 1208 may comprise comparing a received signal strength level of the inter-BSS PPDU to the non-LL OBSS PD level. As mentioned above, performing the SR procedure using an LL OBSS PD level may result in the AP or STA using a more aggressive OBSS PD-based SR.

In an embodiment, step 1208 may further comprise determining the LL OBSS PD level based on a set of LL spatial reuse parameters. As described above, the LL spatial reuse parameters may comprise one or more of: a LL OBSS PD minimum value (LL OBSS_PD min), a LL OBSS PD maximum value (LL OBSS_PD max), and a transmit power reference value (LL TX_PWRref). In an embodiment, the LL OBSS PD level may be determined further based on a bandwidth of the inter-BSS PPDU.

If the conditions of the LL OBSS PD-based SR procedure are satisfied (e.g., the received signal strength level of the inter-BSS PPDU being below the LL OBSS PD level), the AP or STA may transmit a PPDU over a part of the inter-BSS PPDU (the PPDU overlaps a part of inter-BSS PPDU in time and frequency). In an embodiment, the conditions of the LL OBSS PD-based SR procedure being satisfied comprises the received signal strength level of the inter-BSS PPDU being below the LL OBSS PD level.

In an embodiment, when the conditions of the LL OBSS PD-based SR are satisfied, the AP or STA may not update a NAV based on the inter-BSS PPDU. In other words, the AP or STA may ignore the inter-BSS PPDU and may transmit a PPDU without regard to the ongoing transmission of the inter-BSS PPDU over the wireless medium.

Figure 13:
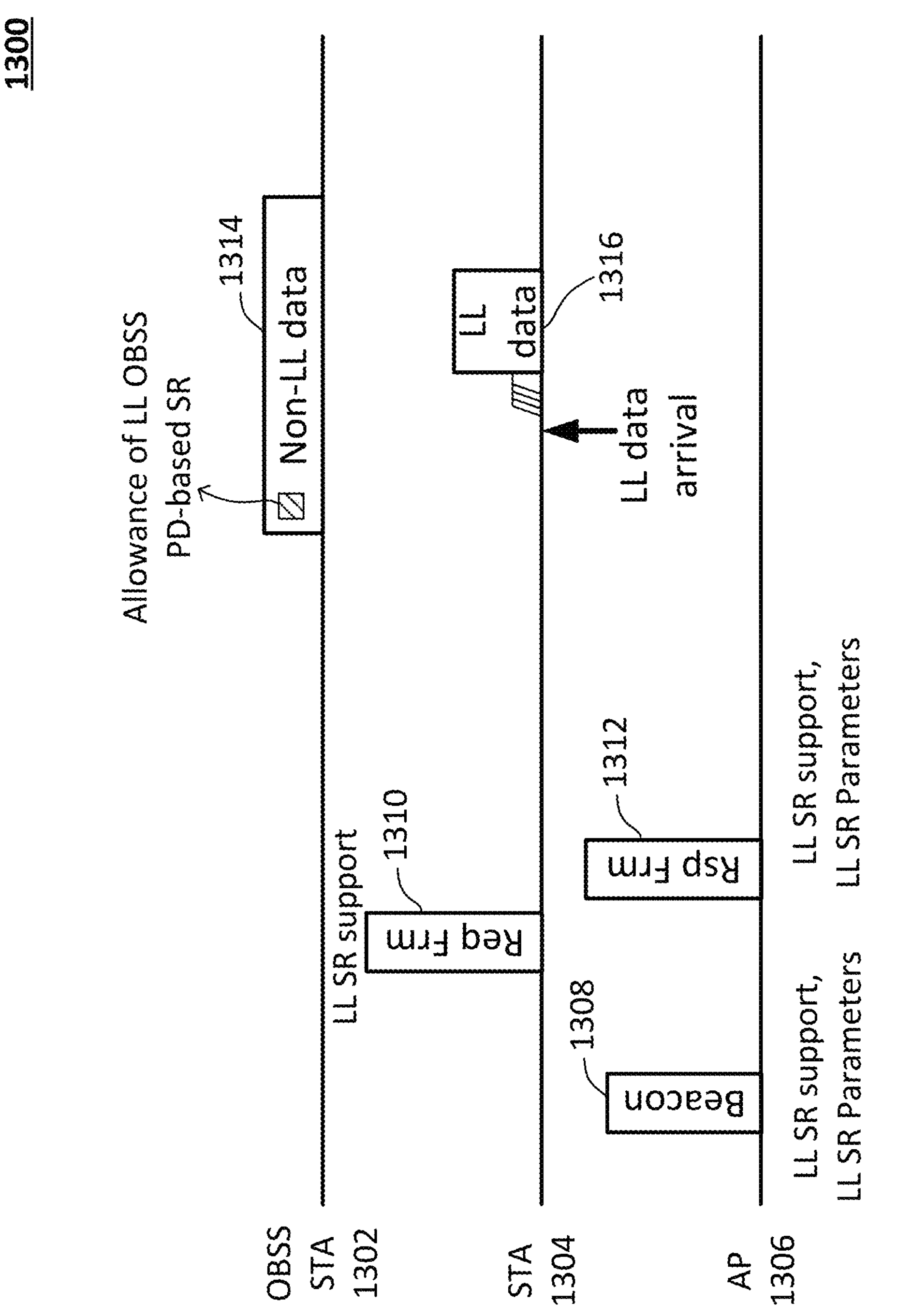
FIG. 13 is an example that illustrates an example LL OBSS PD-based SR operation according to an embodiment.

FIG. 13 is an example 1300 that illustrates an example LL OBSS PD-based SR operation according to an embodiment. As shown in FIG. 13, example 1300 includes an OBSS STA 1302, a STA 1304, and an AP 1306. STA 1304 may be associated with AP 1306. OBSS STA 1302 may be an AP STA or a non-AP STA. STA 1302 belongs to a different BSS than STA 1304 and AP 1306, hence the reference to it as an OBSS STA in example 1300.

As shown in FIG. 13, example 1300 may include AP 1306 transmitting a beacon frame 1308. In an embodiment, beacon frame 1308 may include an indication of support by AP 1306 of LL OBSS PD-based SR operation. As described above, the LL OBSS PD-based SR operation may have a STA or AP use a more aggressive spatial reuse to transmit LL traffic as opposed to non-LL traffic. For example, the LL OBSS PD-based SR operation may include performing an OBSS PD-based SR procedure using an LL OBSS PD level determined based on LL spatial reuse parameters (e.g., LL OBSS_PD min, LL OBSS_PD max, and LL TX_PWRref). In an embodiment, beacon frame 1308 may include an indication of support by AP 1306 of OBSS PD-based SR according to process 1200 described above. In an embodiment, beacon frame 1308 may include or indicate one or more parameters that may be used to derive LL spatial reuse parameters (e.g., LL OBSS PD Max Offset, LL OBSS PD Min Offset, and/or LL TX_PWRref).

In an example, STA 1304 may receive beacon frame 1308 from AP 1306. STA 1304 may transmit a request frame 1310 to AP 1306 in response to beacon frame 1308. Request frame 1310 may be an association request frame requesting association with AP 1306. In an embodiment, the association request frame may include an indication of support by STA 1304 of LL OBSS PD-based SR operation. In an embodiment, the association request frame may include an indication of support by STA 1304 of OBSS PD-based SR according to process 1200 described above. AP 1306 may respond to request frame 1310 by transmitting a response frame 1312 to STA 1304. Response frame 1312 may be an association response frame accepting the association of STA 1304 with AP 1306. In an embodiment, the association response frame may include an indication of support by AP 1306 of LL OBSS PD-based SR operation. In an embodiment, the association response frame may include an indication of support by AP 1306 of OBSS PD-based SR according to process 1200 described above. In an embodiment, the association response frame may include or indicate one or more parameters that may be used to derive LL spatial reuse parameters (e.g., LL OBSS PD Max Offset, LL OBSS PD Min Offset, and/or LL TX_PWRref).

In another example, STA 1304 may or may not receive beacon frame 1308 from AP 1306. Request frame 1310 may be a probe request frame transmitted by STA 1304 to discover WLAN networks in proximity. In an embodiment, the probe request frame may include an indication of support by STA 1304 of LL OBSS PD-based SR operation. In an embodiment, the probe request frame may include an indication of support by STA 1304 of OBSS PD-based SR according to process 1200 described above. AP 1306 may respond to request frame 1310 by transmitting a response frame 1312 to STA 1304. Response frame 1312 may be a probe response frame transmitted by AP 1306 advertising the SSID of its BSS in response to the probe request frame from STA 1304. In an embodiment, the probe response frame may include an indication of support by AP 1306 of LL OBSS PD-based SR operation. In an embodiment, the probe response frame may include an indication of support by AP 1306 of OBSS PD-based SR according to process 1200 described above. In an embodiment, the probe response frame may include or indicate one or more parameters that may be used to derive LL spatial reuse parameters (e.g., LL OBSS PD Max Offset, LL OBSS PD Min Offset, and/or LL TX_PWRref).

Subsequently, OBSS STA 1302 may transmit a PPDU 1314. As mentioned above, OBSS STA 1302 may be an AP STA or a non-AP STA. PPDU 1314 may be transmitted to a STA other than STA 1304 or AP 1306. The other STA may be a STA that belongs to a BSS of OBSS STA 1302. For example, OBSS STA 1302 may be a non-AP STA transmitting PPDU 1314 to its associating AP. PPDU 1314 may comprise a data frame, a management frame, or a control frame. In example 1300, PPDU 1314 comprises a data frame. The data frame may comprise a non-LL data frame (e.g., one or more MPDUs none of which associated with LL TIDs) as shown in FIG. 13 or a LL data frame (e.g., at least one MPDU associated with a LL TID).

In an embodiment, PPDU 1314 includes an indication of whether LL OBSS PD-based SR is allowed over PPDU 1314. The indication of whether LL OBSS PD-based SR is allowed may be provided in a PHY header, a MAC header, or a data field of PPDU 1314. In an embodiment, the indication of whether LL OBSS PD-based SR is allowed may explicitly indicate either allowance or disallowance of LL OBSS PD-based SR. In another embodiment, the indication may explicitly indicate allowance only or disallowance only of LL OBSS PD-based SR. The absence of the indication in the inter-BSS PPDU may be interpreted by the AP or STA as disallowance or allowance, respectively, of LL OBSS PD-based SR.

In example 1300, PPDU 1314 may indicate allowance of LL OBSS PD-based SR over PPDU 1314. In an embodiment, on receiving PPDU 1314 and having traffic available for transmission, STA 1304 may perform a process similar to process 1200 described above. Specifically, in an embodiment, STA 1304 may first determine whether traffic available for transmission includes LL traffic. In example 1300, it assumed that STA 1304 has LL traffic become available for transmission before or while PPDU 1314 is being transmitted. As such, STA 1304 may next determine whether PPDU 1314 allows LL OBSS PD-based SR. As PPDU 1314 allows LL OBSS PD-based SR in example 1300, STA 1304 may perform an LL OBSS PD-based SR procedure relative to PPDU 1314. The LL OBSS PD-based SR procedure may be as described above in step 1208 of process 1200. In an embodiment, STA 1304 may compare a received signal strength level of PPDU 1314 to a non-LL OBSS PD level.

In example 1300, it is assumed that the conditions of the LL OBSS PD-based SR procedure are satisfied. As such, STA 1304 may transmit a PPDU 1316 over a part of PPDU 1314 (PPDU 1316 overlaps a part of PPDU 1314 in time and frequency). PPDU 1316 may include one or more MSDUs comprising LL data frames. In an embodiment, the conditions of the LL OBSS PD-based SR procedure being satisfied comprises the received signal strength level of PPDU 1314 being below the LL OBSS PD level. In an embodiment, when the conditions of the LL OBSS PD-based SR procedure are satisfied, STA 1304 may not update a NAV based on PPDU 1314.

Figure 14:
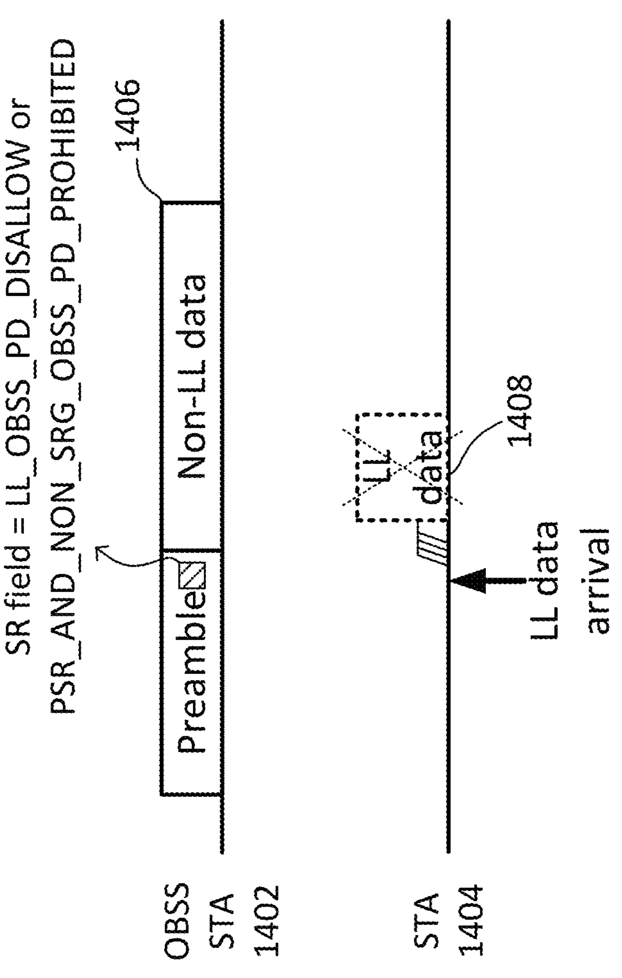
FIG. 14 is an example that illustrates another example LL OBSS PD-based SR operation according to an embodiment.

FIG. 14 is an example 1400 that illustrates another example LL OBSS PD-based SR operation according to an embodiment. As shown in FIG. 14, example 1400 includes an OBSS STA 1402 and a STA 1404. OBSS STA 1402 may be an AP STA or a non-AP STA. STA 1404 may be an AP STA or a non-AP STA. STA 1402 belongs to a different BSS than STA 1404, hence the reference to it as an OBSS STA in example 1400.

OBSS STA 1402 may transmit a PPDU 1406. PPDU 1406 may be transmitted to a STA (not shown in FIG. 14) that belongs to a BSS of OBSS STA 1402. For example, OBSS STA 1402 may be a non-AP STA transmitting PPDU 1406 to its associating AP. PPDU 1406 may comprise a data frame, a management frame, or a control frame. In example 1400, PPDU 1406 comprises a data frame. The data frame may comprise a non-LL data frame (e.g., one or more MPDUs none of which associated with LL TIDs) as shown in FIG. 14 or a LL data frame (e.g., at least one MPDU associated with a LL TID).

In an embodiment, PPDU 1406 includes an indication of whether LL OBSS PD-based SR is allowed over PPDU 1406. In an embodiment, the indication of whether LL OBSS PD-based SR is allowed may explicitly indicate either allowance or disallowance of LL OBSS PD-based SR. In another embodiment, the indication may explicitly indicate allowance only or disallowance only of LL OBSS PD-based SR. The absence of the indication in the inter-BSS PPDU may be interpreted by STA 1404, for example, as disallowance or allowance, respectively, of LL OBSS PD-based SR.

In example 1400, the indication of whether LL OBSS PD-based SR is allowed is provided in a PHY header of PPDU 1406. The signaling of the indication in the PHY header of PPDU 1406 enables a receiving STA/AP to quickly determine whether PPDU 1406 allows LL OBSS PD-based SR and perform the appropriate (non-LL or LL) SR procedure accordingly. If the conditions of the performed SR procedure are satisfied, the STA/AP may stop receiving PPDU 1406. In an embodiment, the indication of whether LL OBSS PD-based SR is allowed is provided in a signal field of the PHY header of the PPDU 1406. The signal field may comprise a U-SIG, and EHT-SIG, or an ultra-high reliability signal field (UHR-SIG) of the PHY header of PPDU 1406. For example, in an EHT PPDU, the indication may be provided in either the U-SIG or the EHT-SIG. For a TB PPDU, the indication may be provided in the U-SIG. In an embodiment, the indication of whether LL OBSS PD-based SR is allowed is provided in a spatial reuse (SR) field of the signal field. For example, the indication may indicate disallowance of LL OBSS PD-based SR over PPDU 1406 when the SR field indicates a value corresponding to one of: LL_OBSS_PD_DISALLOW (or LL_SR_DISALLOW) or PSR_AND_NON_SRG_OBSS_PD_PROHIBITED. Otherwise, if the SR field does not indicate LL_OBSS_PD_DISALLOW or PSR_AND_NON_SRG_OBSS_PD_PROHIBITED, the indication may be interpreted by STA 1404 as indicating allowance of LL OBSS PD-based SR over PPDU 1406. In another embodiment, the absence of an SR field in the PHY header of PPDU 1406 may be interpreted by STA 1404 as disallowance of LL OBSS PD-based SR over PPDU 1406.

In example 1400, the indication of whether LL OBSS PD-based SR is allowed is provided in an SR field of a SIG field of the PHY header of PPDU 1406. Specifically, the SR field of PPDU 1406 may indicate a value corresponding to LL_OBSS_PD_DISALLOW (or LL_SR_DISALLOW) or PSR_AND_NON_SRG_OBSS_PD_PROHIBITED, meaning that LL OBSS PD-based SR is disallowed over PPDU 1406.

In an embodiment, on receiving PPDU 1406 and having traffic available for transmission, STA 1404 may perform a process similar to process 1200 described above. Specifically, in an embodiment, STA 1404 may first determine whether traffic available for transmission includes LL traffic. In example 1400, it assumed that STA 1404 has LL traffic become available for transmission before or while PPDU 1406 is being transmitted. As such, STA 1404 may next determine whether PPDU 1406 allows LL OBSS PD-based SR. As PPDU 1406 does not allow LL OBSS PD-based SR in example 1400, STA 1404 may perform a non-LL OBSS PD-based SR procedure relative to PPDU 1406. The non-LL OBSS PD-based SR procedure may be as described above in step 1204 of process 1200. In an embodiment, STA 1404 may compare a received signal strength level of PPDU 1404 to a non-LL OBSS PD level.

In example 1400, it is assumed that the conditions of the non-LL OBSS PD-based SR procedure are not satisfied. For example, the received signal strength level of PPDU 1404 may not be below the non-OBSS PD level. As such, STA 1404 may not ignore PPDU 1406 and may update its NAV based on PPDU 1406. STA 1404 may thus not transmit a PPDU 1408 comprising LL data over PPDU 1406.

Figure 15:
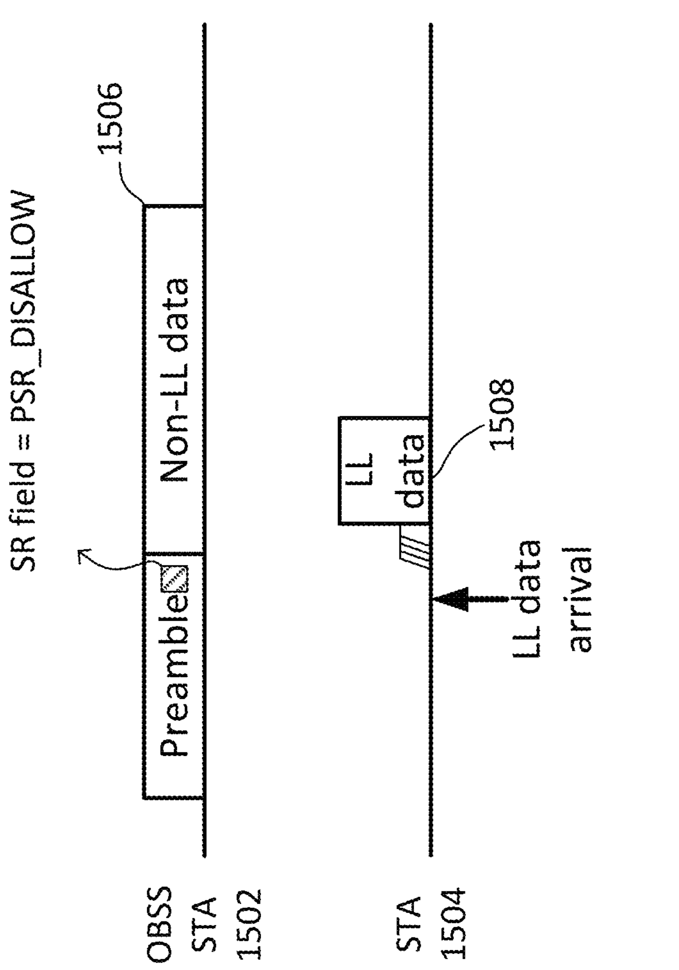
FIG. 15 is an example that illustrates another example LL OBSS PD-based SR operation according to an embodiment.

FIG. 15 is an example 1500 that illustrates another example LL OBSS PD-based SR operation according to an embodiment. As shown in FIG. 15, example 1500 includes an OBSS STA 1502 and a STA 1504. OBSS STA 1502 may be an AP STA or a non-AP STA. STA 1504 may be an AP STA or a non-AP STA. STA 1502 belongs to a different BSS than STA 1504, hence the reference to it as an OBSS STA in example 1500.

OBSS STA 1502 may transmit a PPDU 1506. PPDU 1506 may be transmitted to a STA (not shown in FIG. 15) that belongs to a BSS of OBSS STA 1502. For example, OBSS STA 1502 may be a non-AP STA transmitting PPDU 1506 to its associating AP. PPDU 1506 may comprise a data frame, a management frame, or a control frame. In example 1500, PPDU 1506 comprises a data frame. The data frame may comprise a non-LL data frame (e.g., one or more MPDUs none of which associated with LL TIDs) as shown in FIG. 15 or a LL data frame (e.g., at least one MPDU associated with a LL TID).

In an embodiment, PPDU 1506 includes an indication of whether LL OBSS PD-based SR is allowed over PPDU 1506. In an embodiment, the indication of whether LL OBSS PD-based SR is allowed may explicitly indicate either allowance or disallowance of LL OBSS PD-based SR. In another embodiment, the indication may explicitly indicate allowance only or disallowance only of LL OBSS PD-based SR. The absence of the indication in the inter-BSS PPDU may be interpreted by STA 1504, for example, as disallowance or allowance, respectively, of LL OBSS PD-based SR.

In example 1500, the indication of whether LL OBSS PD-based SR is allowed is provided in a PHY header of PPDU 1506. The signaling of the indication in the PHY header of PPDU 1506 enables a receiving STA/AP to quickly determine whether PPDU 1506 allows LL OBSS PD-based SR and perform the appropriate (non-LL or LL) SR procedure accordingly. If the conditions of the performed SR procedure are satisfied, the STA/AP may stop receiving PPDU 1506. In an embodiment, the indication of whether LL OBSS PD-based SR is allowed is provided in a signal field of the PHY header of the PPDU 1506. The signal field may comprise a U-SIG, an EHT-SIG, or a UHR-SIG of the PHY header of PPDU 1506. In an embodiment, the indication of whether LL OBSS PD-based SR is allowed is provided in a spatial reuse (SR) field of the signal field. For example, the indication may indicate disallowance of LL OBSS PD-based SR over PPDU 1506 when the SR field indicates a value corresponding to one of: LL_OBSS_PD_DISALLOW (or LL_SR_DISALLOW) or PSR_AND_NON_SRG_OBSS_PD_PROHIBITED. Otherwise, if the SR field does not indicate LL_OBSS_PD_DISALLOW or PSR_AND_NON_SRG_OBSS_PD_PROHIBITED, the indication may be interpreted by STA 1504 as indicating allowance of LL OBSS PD-based SR over PPDU 1506.

In example 1500, the indication of whether LL OBSS PD-based SR is allowed is provided in an SR field of a SIG field of the PHY header of PPDU 1506. Specifically, the SR field of PPDU 1506 may indicate a value corresponding to PSR DISALLOW. As the indicated value is not one of LL_OBSS_PD_DISALLOW (or LL_SR_DISALLOW) or PSR_AND_NON_SRG_OBSS_PD_PROHIBITED, LL OBSS PD-based SR is allowed over PPDU 1506.

In an embodiment, on receiving PPDU 1506 and having traffic available for transmission, STA 1504 may perform a process similar to process 1200 described above. Specifically, in an embodiment, STA 1504 may first determine whether traffic available for transmission includes LL traffic. In example 1500, it assumed that STA 1504 has LL traffic become available for transmission before or while PPDU 1506 is being transmitted. As such, STA 1504 may next determine whether PPDU 1506 allows LL OBSS PD-based SR. As PPDU 1506 allows LL OBSS PD-based SR in example 1500, STA 1504 may perform an LL OBSS PD-based SR procedure relative to PPDU 1506. The LL OBSS PD-based SR procedure may be as described above in step 1208 of process 1200. In an embodiment, STA 1504 may compare a received signal strength level of PPDU 1506 to an LL OBSS PD level.

In example 1500, it is assumed that the conditions of the LL OBSS PD-based SR procedure are satisfied. As such, STA 1504 may transmit a PPDU 1508 over a part of PPDU 1506 (PPDU 1508 overlaps a part of PPDU 1506 in time and frequency). PPDU 1508 may include one or more MSDUs comprising LL data frames. In an embodiment, the conditions of the LL OBSS PD-based SR procedure being satisfied comprises the received signal strength level of PPDU 1506 being below the LL OBSS PD level. In an embodiment, when the conditions of the LL OBSS PD-based SR procedure are satisfied, STA 1504 may not update a NAV based on PPDU 1506.

Figure 16:
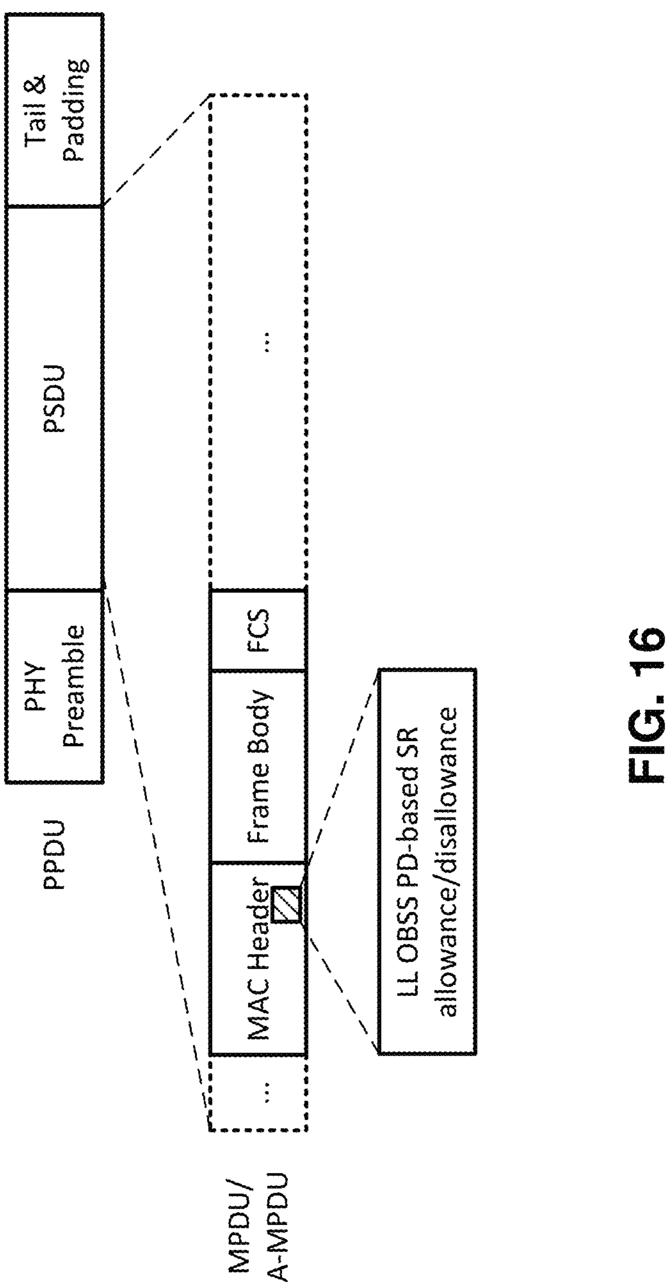
FIG. 16 illustrates an example PPDU indicating allowance/disallowance of LL OBSS PD-based SR.

In an embodiment, as mentioned above, the indication of whether LL OBSS PD-based SR is allowed over a PPDU may be indicated in a MAC header of the PPDU. An advantage of this embodiment is that it enables the indication to be carried by PPDUs that may not allow the indication to be carried in the PHY header. For example, pre-EHT (legacy) PPDUs may not allow the indication to be carried in a SIG field of the PHY header. This embodiment allows such PPDUs to also include an indication of whether LL OBSS PD-based SR is allowed, extending the protection enabled by embodiments of the present disclosure to these PPDUs. FIG. 16 illustrates an example PPDU 1600 in which the indication of whether LL OBSS PD-based SR is allowed is indicated in the MAC header. In an embodiment, the indication may be provided in an aggregated control (A-Control) field of the MAC header.

Figure 17:
FIG. 17 is an example that illustrates another example LL OBSS PD-based SR operation according to an embodiment.
Figure 17:
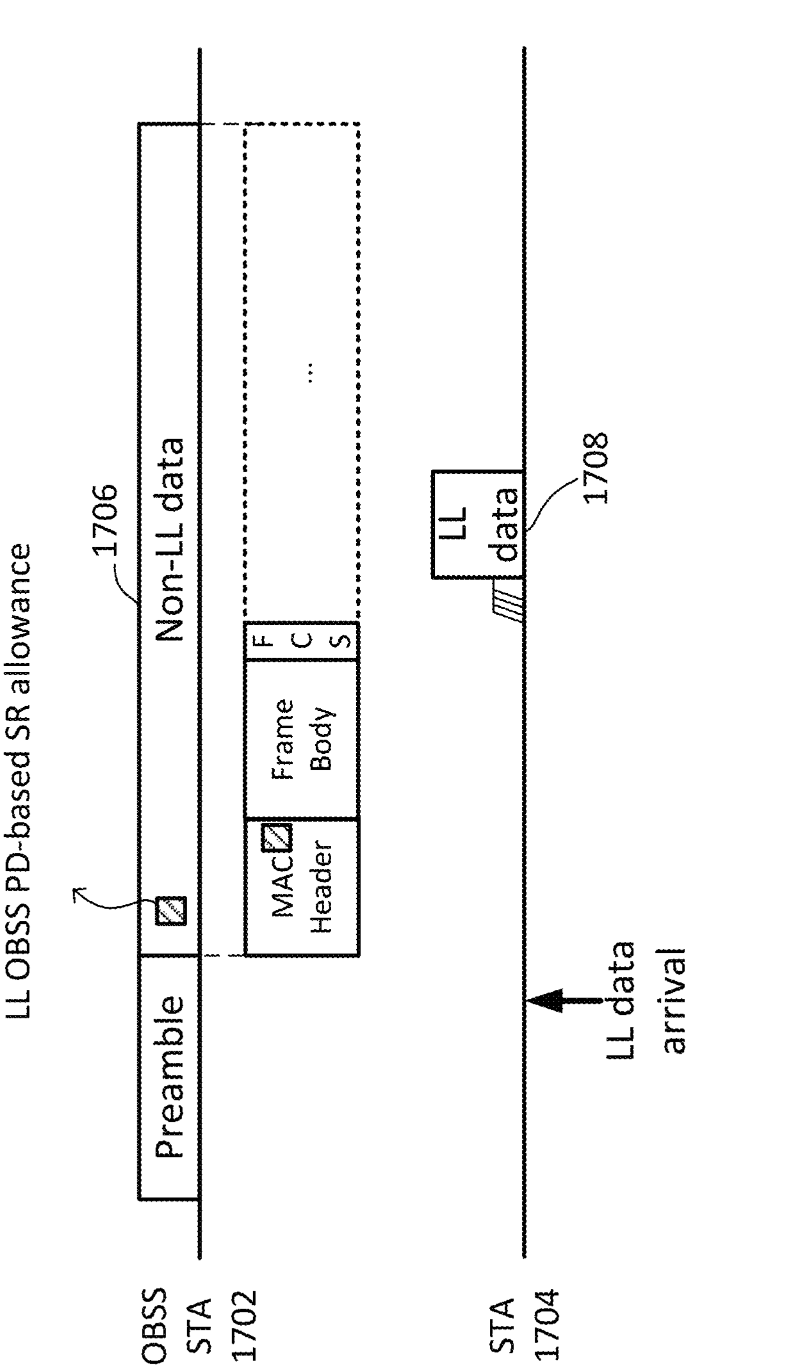

FIG. 17 is an example 1700 that illustrates another example LL OBSS PD-based SR operation according to an embodiment in which the indication is provided in the MAC header of the PPDU. As shown in FIG. 17, example 1700 includes an OBSS STA 1702 and a STA 1704. OBSS STA 1702 may be an AP STA or a non-AP STA. STA 1704 may be an AP STA or a non-AP STA. STA 1702 belongs to a different BSS than STA 1704, hence the reference to it as an OBSS STA in example 1700.

OBSS STA 1702 may transmit a PPDU 1706. PPDU 1706 may be transmitted to a STA (not shown in FIG. 17) that belongs to a BSS of OBSS STA 1702. For example, OBSS STA 1702 may be a non-AP STA transmitting PPDU 1706 to its associating AP. PPDU 1706 may comprise a data frame, a management frame, or a control frame. In example 1700, PPDU 1706 comprises a data frame. The data frame may comprise a non-LL data frame (e.g., one or more MPDUs none of which associated with LL TIDs) as shown in FIG. 17 or a LL data frame (e.g., at least one MPDU associated with a LL TID).

In an embodiment, PPDU 1706 includes an indication of whether LL OBSS PD-based SR is allowed over PPDU 1706. In an embodiment, the indication of whether LL OBSS PD-based SR is allowed may explicitly indicate either allowance or disallowance of LL OBSS PD-based SR. In another embodiment, the indication may explicitly indicate allowance only or disallowance only of LL OBSS PD-based SR. The absence of the indication in the inter-BSS PPDU may be interpreted by STA 1704, for example, as disallowance or allowance, respectively, of LL OBSS PD-based SR.

In example 1700, the indication of whether LL OBSS PD-based SR is allowed is provided in a MAC header of PPDU 1706. In an embodiment, the indication of whether LL OBSS PD-based SR is allowed is provided in an A-Control field of the MAC header of PPDU 1706.

In example 1700, it is assumed that the indication in the MAC header of PPDU 1706 indicates allowance of LL OBSS PD-based SR over PPDU 1706. In an embodiment, on receiving PPDU 1706 and having traffic available for transmission, STA 1704 may perform a process similar to process 1200 described above. Specifically, in an embodiment, STA 1704 may first determine whether traffic available for transmission includes LL traffic. In example 1700, it assumed that STA 1704 has LL traffic become available for transmission before or while PPDU 1706 is being transmitted. As such, STA 1704 may next determine whether PPDU 1706 allows LL OBSS PD-based SR. In an embodiment, as the indication of whether LL OBSS PD-based SR is allowed in the MAC header of PPDU 1706, STA 1704 may decode at least the MAC header of PPDU 1706. As PPDU 1706 allows LL OBSS PD-based SR in example 1700, STA 1704 may perform an LL OBSS PD-based SR procedure relative to PPDU 1706. The LL OBSS PD-based SR procedure may be as described above in step 1208 of process 1200. In an embodiment, STA 1704 may compare a received signal strength level of PPDU 1706 to an LL OBSS PD level.

In example 1700, it is assumed that the conditions of the LL OBSS PD-based SR procedure are satisfied. As such, STA 1704 may transmit a PPDU 1708 over a (remaining) part of PPDU 1706 (PPDU 1708 overlaps a part of PPDU 1706 in time and frequency). PPDU 1708 may include one or more MSDUs comprising LL data frames. In an embodiment, the conditions of the LL OBSS PD-based SR procedure being satisfied comprises the received signal strength level of PPDU 1706 being below the LL OBSS PD level. In an embodiment, when the conditions of the LL OBSS PD-based SR procedure are satisfied, STA 1704 may not update a NAV based on PPDU 1706.

Figure 18:
FIG. 18 illustrates an example process according to an embodiment.
Figure 18:
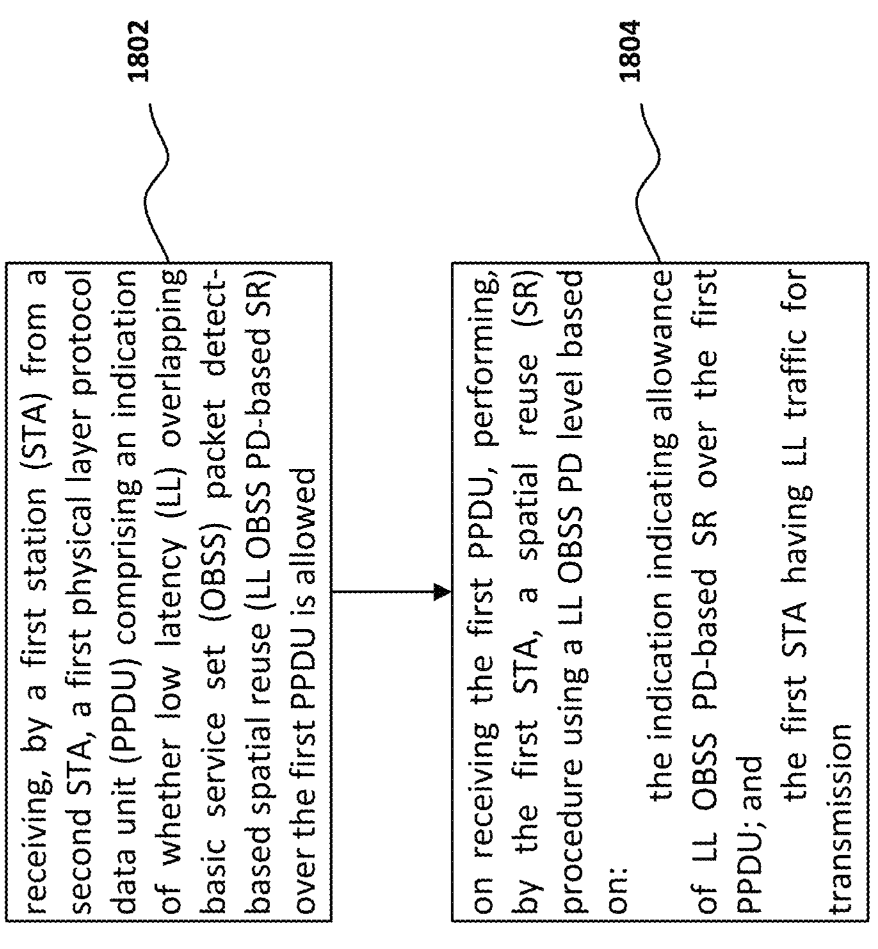

FIG. 18 illustrates an example process 1800 according to an embodiment. Process 1800 may be performed by a first STA. The first STA may be a non-AP STA or an AP STA. As shown in FIG. 18, process 1800 includes steps 1802 and 1804.

Step 1802 includes receiving, by the first STA from a second STA, a first PPDU comprising an indication of whether LL OBSS PD-based SR over the first PPDU is allowed.

The second STA may be an AP STA or a non-AP STA. In an embodiment, the second STA belongs to a different BSS than the first STA (the second STA is an OBSS STA relative to the first STA). In an embodiment, the first PPDU is an inter-BSS PPDU for the first STA.

In an embodiment, the first PPDU does not comprise LL traffic. In another embodiment, the first PPDU comprises LL traffic.

In an embodiment, the indication of whether LL OBSS PD-based SR over the first PPDU is allowed is provided in a PHY header of the first PPDU. In an embodiment, the indication of whether LL OBSS PD-based SR over the first PPDU is allowed is provided in a signal field of the PHY header of the first PPDU. In an embodiment, the signal field comprises a U-SIG or a UHR-SIG of the PHY header of the first PPDU.

In an embodiment, the indication of whether LL OBSS PD-based SR over the first PPDU is allowed is provided in an SR field of the signal field of the PHY header of the first PPDU. In an embodiment, the indication indicates allowance of LL OBSS PD-based SR when the SR field does not indicate a value corresponding to one of: LL_OBSS_PD_DISALLOW and PSR_AND_NON_SRG_OBSS_PD_PROHIBITED. In an embodiment, the indication indicates disallowance of LL OBSS PD-based SR when the SR field indicates a value corresponding to one of: LL_SR_DISALLOW and PSR_AND_NON_SRG_OBSS_PD_PROHIBITED.

In an embodiment, the indication of whether LL OBSS PD-based SR over the first PPDU is allowed is provided in a MAC header of the first PPDU. In an embodiment, the indication of whether LL OBSS PD-based SR over the first PPDU is allowed is provided in an A-Control field of the MAC header of the first PPDU.

In an embodiment, the indication of whether LL OBSS PD-based SR over the first PPDU is allowed is provided in a data field of the first PPDU.

Step 1804 includes, on receiving the first PPDU, performing, by the first STA, an SR procedure using a LL OBSS PD level based on: the indication indicating allowance of LL OBSS PD-based SR over the first PPDU; and the first STA having LL traffic for transmission.

In an embodiment, process 1800 may further comprise determining the LL OBSS PD level, on receiving the first PPDU, based on a set of LL spatial reuse parameters. The LL spatial reuse parameters may comprise one or more of: a LL OBSS PD minimum value, a LL OBSS PD maximum value, and a transmit power reference value. In an embodiment, process 1800 may further comprise receiving one or more parameter of the set of LL spatial reuse parameters from an AP. In an embodiment, determining the LL OBSS PD level further comprises determining the LL OBSS PD level based on a bandwidth of the first PPDU.

In an embodiment, performing the SR procedure comprises comparing a received signal strength level of the first PPDU to the LL OBSS PD level.

In an embodiment, process 1800 may further comprise transmitting, by the first STA to a third STA, a second PPDU comprising the LL traffic, over a part of the first PPDU, based on conditions of the SR procedure being satisfied.

In an embodiment, the conditions of the SR procedure being satisfied comprises the received signal strength level of the first PPDU being below the LL OBSS PD level.

In an embodiment, process 1800 may further comprise not updating a NAV of the first STA based on the first PPDU, based on conditions of the SR procedure being satisfied.

In an embodiment, process 1800 may further comprise performing the SR procedure based on a non-LL OBSS PD level when the indication indicates disallowance of LL OBSS PD-based SR over the first PPDU. In another embodiment, process 1800 may further comprise performing the SR procedure based on a non-LL OBSS PD level when the first STA has no LL traffic (has non-LL traffic) for transmission. In an embodiment, the non-LL OBSS PD level comprises an SRG OBSS PD level or a non-SRG OBSS PD level.

In an embodiment, process 1800 may further comprise transmitting, by the first STA, a frame comprising an indication of support of LL OBSS PD-based SR.

What is claimed is:

1. A method comprising:

receiving, by a first station (STA) from a second STA, a first physical layer protocol data unit (PPDU) comprising an indication of whether low latency (LL) overlapping basic service set (OBSS) packet detect (PD)-based spatial reuse (LL OBSS PD-based SR) over the first PPDU is allowed;

on receiving the first PPDU, performing, by the first STA, a spatial reuse (SR) procedure using a LL OBSS PD level based on:

the indication indicating allowance of the LL OBSS PD-based SR over the first PPDU; and the first STA having LL traffic for transmission; and transmitting, by the first STA to a third STA, a second PPDU comprising the LL traffic, over a part of the first PPDU, based on conditions of the SR procedure being satisfied.

2. A method comprising:

receiving, by a first station (STA) from a second STA, a first physical layer protocol data unit (PPDU) comprising an indication of whether low latency (LL) overlapping basic service set (OBSS) packet detect-based spatial reuse (LL OBSS PD-based SR) over the first PPDU is allowed; and on receiving the first PPDU, performing, by the first STA, a spatial reuse (SR) procedure using a LL OBSS PD level based on:

the indication indicating allowance of the LL OBSS PD-based SR over the first PPDU; and the first STA having LL traffic for transmission.

3. The method of claim 2, wherein performing the SR procedure comprises comparing a received signal strength level of the first PPDU to the LL OBSS PD level.

4. The method of claim 3, further comprising transmitting, by the first STA to a third STA, a second PPDU comprising the LL traffic, over a part of the first PPDU, based on conditions of the SR procedure being satisfied.

5. The method of claim 4, wherein the conditions of the SR procedure being satisfied comprises the received signal strength level of the first PPDU being below the LL OBSS PD level.

6. The method of claim 5, further comprising not updating a network allocation vector (NAV) based on the first PPDU based on conditions of the SR procedure being satisfied.

7. The method of claim 6, further comprising determining the LL OBSS PD level, on receiving the first PPDU, based on a set of LL spatial reuse parameters.

8. The method of claim 7, wherein the LL spatial reuse parameters comprise one or more of: a LL OBSS PD minimum value, a LL OBSS PD maximum value, and a transmit power reference value.

9. The method of claim 8, further comprising receiving one or more parameter of the set of LL spatial reuse parameters from an access point (AP).

10. The method of claim 9, wherein the indication of whether LL OBSS PD-based SR over the first PPDU is allowed is provided in a physical layer (PHY) header of the first PPDU.

11. The method of claim 9, wherein the indication of whether LL OBSS PD-based SR over the first PPDU is allowed is provided in a medium access control (MAC) header of the first PPDU.

12. The method of claim 11, further comprising performing the SR procedure based on a non-LL OBSS PD level when the indication indicates disallowance of the LL OBSS PD-based SR over the first PPDU.

13. The method of claim 12, further comprising performing the SR procedure based on a non-LL OBSS PD level when the first STA has no LL traffic for transmission.

14. The method of claim 13, wherein the first STA or the second STA comprises an access point (AP) STA or a non-AP STA.

15. A method comprising:

transmitting, by a station (STA), a first physical layer protocol data unit (PPDU) comprising an indication of whether low latency (LL) overlapping basic service set (OBSS) packet detect (PD)-based spatial reuse (LL OBSS PD-based SR) over the first PPDU is allowed.

16. The method of claim 15, wherein the indication of whether the LL OBSS PD-based SR over the first PPDU is allowed was determined from a physical layer (PHY) header of the first PPDU.

17. The method of claim 16, wherein the indication of whether the LL OBSS PD-based SR over the first PPDU is allowed was determined from a signal field of the PHY header of the first PPDU.

18. The method of claim 15, wherein the indication of whether the LL OBSS PD-based SR over the first PPDU is allowed was determined from a medium access control (MAC) header of the first PPDU.

19. The method of claim 18, wherein the indication of whether the LL OBSS PD-based SR over the first PPDU is allowed was determined from an aggregated control (A-Control) field of the MAC header of the first PPDU.

20. The method of claim 15, wherein the indication of whether the LL OBSS PD-based SR over the first PPDU is allowed was determined from a data field of the first PPDU.

* * * * *